(12) United States Patent
Kunibe et al.

(10) Patent No.: US 7,197,391 B2
(45) Date of Patent: Mar. 27, 2007

(54) METHOD AND APPARATUS FOR CONTROLLING AN ENGINE USING A CAM SIGNAL

(75) Inventors: Hirotaka Kunibe, Nagoya (JP); Hirokazu Komori, Okazaki (JP); Tadaharu Nishimura, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/337,070

(22) Filed: Jan. 23, 2006

(65) Prior Publication Data

US 2006/0167615 A1  Jul. 27, 2006

(30) Foreign Application Priority Data

Jan. 21, 2005  (JP) .............................. 2005-014748

(51) Int. Cl.
 *F02D 45/00* (2006.01)

(52) U.S. Cl. .................. 701/114; 123/406.18; 73/118.1

(58) Field of Classification Search ................ 701/114, 701/110, 115, 102; 123/406.18, 406.22, 123/406.58, 406.62; 73/116, 118.1, 117.3
See application file for complete search history.

(56) References Cited

U.S. PATENT DOCUMENTS

| | | | |
|---|---|---|---|
| 5,269,274 A | 12/1993 | Flaetgen et al. | |
| 5,671,145 A | 9/1997 | Krebs et al. | |
| 6,445,998 B2 | 9/2002 | Ando | |
| 6,775,611 B2 * | 8/2004 | Kobayashi et al. | ......... 701/114 |
| 6,805,096 B2 * | 10/2004 | Iizuka | ................... 123/406.18 |

FOREIGN PATENT DOCUMENTS

| | | |
|---|---|---|
| JP | H05-240102 | 9/1993 |
| JP | H07-310582 | 11/1995 |
| JP | 2000-104619 | 4/2000 |
| JP | 2001-200747 | 7/2001 |
| JP | 2001-214790 | 8/2001 |
| JP | 2001-342888 | 12/2001 |
| JP | 2002-242748 | 8/2002 |
| JP | 2003-049696 | 2/2003 |
| JP | 2003-065139 | 3/2003 |

* cited by examiner

*Primary Examiner*—Hieu T. Vo
(74) *Attorney, Agent, or Firm*—Nixon & Vanderhye P.C.

(57) ABSTRACT

In an apparatus, an abnormality determining circuit determines whether a crank signal is abnormal, and a switching circuit switches an input signal to an edge interval measuring circuit from the crank signal to a cam signal when it is determined that the crank signal is abnormal. The edge interval measuring circuit measures an edge interval of temporally adjacent same-directed edges of the cam signal. A count-value control circuit identifies angular positions of a crankshaft based on the cam signal to initialize a count value of a count unit based on the identified angular positions of the crankshaft. The count-value control unit circuit changes an integral number based on a predetermined waveform pattern of the cam signal to shift the count value of the count unit as in the case of the crank signal inputting to the edge interval measuring circuit.

10 Claims, 16 Drawing Sheets

METHOD AND APPARATUS FOR CONTROLLING AN ENGINE USING A CAM SIGNAL

CROSS REFERENCE TO RELATED APPLICATION

This application is based on Japanese Patent Application 2005-014748 filed on Jan. 21, 2005 and claims the benefit of priority therefrom, so that the descriptions of which are all incorporated herein by reference.

BACKGROUND OF THE INVENTION

1. Field of the Invention

The present invention relates to a method and apparatus for controlling an engine using a cam signal.

2. Description of the Related Art

Conventional engine control units for vehicles have carried out engine control, such as fuel injection control and/or ignition timing control, in synchronization with rotation of an engine crankshaft.

Specifically, a crank signal is output from a crankshaft sensor. The crank signal consists of a train of crank pulses whose same-directed edges correspond to angular positions of the crankshaft as it rotates. A pulse cycles of the pulse train corresponds to a predetermined angular interval of the crankshaft rotation. When the detected crank signal is input to the engine control unit, the engine control unit multiplies a frequency of the crank signal to generate a frequency-multiplication clock signal. For details, the frequency-multiplication clock signal consists of a train of clock pulses whose clock cycle is a positive integral submultiple of the pulse cycle of the crank signal.

The engine control unit increments an angular counter indicative of a rotational position (crank position) of the crankshaft in response to the multiplication clock signal in accordance with a crank-signal synchronized control program that has been stored in the engine control unit. The crank position of the crankshaft can be referred to as crank angle. This allows the engine control unit to grasp the crank position of the crankshaft with a resolution higher than that obtained based on the angular intervals of the crankshaft. The resolution obtained by using the angular counter can be represented as the value obtained by dividing an angular interval of the crankshaft by the number of the multiplication. When the count value of the angular counter coincides with a predetermined setting corresponding to a given crank position, the engine control unit carries out fuel injection or ignition. These operations of the engine control unit are for example disclosed in Japanese Unexamined Patent Publication No. 2001-200747 and U.S. Pat. No. 6,445,998B1 corresponding to Japanese Unexamined Patent Publication No. 2001-214790.

An engine control unit of this type includes a pulse-edge interval counter and a multiplication counter as means for generating the multiplication clock signal. The pulse-edge interval counter is configured to measure time intervals between active edges, such as trailing edges, of a pulse signal input thereto. The measured intervals will be referred to as pulse-edge intervals hereinafter.

The multiplication counter is configured to generate a frequency-multiplication clock signal in synchronization with the pulse signal; this frequency-multiplication clock signal consists of a train of clock pulses whose clock cycles correspond to time intervals obtained by dividing the measured pulse-edge intervals by the predetermined number of multiplication.

Specifically, when the crank signal is input as the pulse signal to the pulse-edge interval counter, the pulse-edge interval counter measures pulse-edge intervals between active edges of temporally adjacent crank pulses in the input crank signal. The multiplication counter generates the frequency-multiplication clock signal consisting of a train of clock pulses whose clock cycles correspond to time intervals obtained by dividing the measured pulse-edge intervals by the predetermined number of multiplication.

Note that, in the Japanese Unexamined Patent Publication No. 2001-200747 and U.S. Pat. No. 6,445,998B1, the direction of each of the same-directed pulse edges of the crank pulses in the crank signal is the same as that of each of the active edges of a pulse signal input to the pulse-edge interval counter. This allows the crank signal to be directly input to the pulse-edge interval counter. If the direction of each of the same-directed pulse edges of the crank pulses in the crank signal is different from that of each of the active edges of a pulse signal input to the pulse-edge interval counter, the crank signal can be input to the pulse-edge interval counter with its level being inverted.

In engine control units using the crank signal for engine control, if the crank signal fails to be input to the pulse-edge interval counter due to, for example, a break in wires connecting the crankshaft sensor and the pulse-edge interval counter, the frequency-multiplication clock signal cannot be generated. This may cause the count operation of the angular counter to stop so that the engine control unit may not carry out engine control in synchronization with rotation of the crankshaft.

Engine control units using the crank signal for engine control have therefore stored therein a fail-safe control program in addition to the crank-signal synchronized control program. The fail-safe control program is designed to cause a computer, such as a microcomputer of the engine control unit, to carry out engine control, such as fuel injection control and/or ignition timing control, based on a cam signal output from a camshaft sensor. The cam signal is configured to vary between its high and low levels depending on rotation of an engine camshaft.

Specifically, when detecting an abnormality of the crank signal, the engine control unit runs the fail-safe control program in place of the crank-signal synchronized control program to allow the vehicle to be driven in a limp-home mode, namely, driven home slowly.

On the other hand, U.S. Pat. No. 5,671,145 corresponding to Japanese Unexamined Patent Publication No. H07-310582 discloses a method of generating a simulated crank signal based on a cam signal detected by a cam sensor in an event of a failure of a crankshaft sensor, and of controlling the engine based on the simulated crank signal.

Install of the fail-safe control program in an engine control unit in addition to the crank-signal synchronized control program may reduce free space therein and increase the number of person-hours required to develop engine-control software including the control programs.

The publication U.S. Pat. No. 5,671,145 discloses generation of the simulated crank signal based on the cam signal, but may not disclose specific configurations and operations required to generate the simulated crank signal. Moreover, in order to concretize the techniques disclosed in the Publication U.S. Pat. No. 5,671,145, a dedicated circuit is probably required to generate the simulated crank signal based on the cam signal, which may increase hardware configuration in the engine control unit.

SUMMARY OF THE INVENTION

The present invention has been made on the background so that preferable embodiments of the present invention are capable of allowing a vehicle to be driven in a limp-home mode in an event of an error in a crank signal while holding the increase in hardware components and/or engine-control software.

According to an aspect of the present invention, there is provided an apparatus for controlling an engine using a cam signal in addition to a crank signal. The cam signal includes a series of changes between high and low levels in a predetermined waveform pattern. Same directed edges of the changes of the cam signal corresponds to angular positions of rotation of a camshaft of the engine. The crank signal includes a train of crank pulses whose same-directed edges correspond to angular positions of rotation of a crankshaft of the engine. The angular positions of rotation of the camshaft are associated with those of rotation of the crankshaft. The apparatus includes an edge interval measuring unit designed to receive an input signal including a series of changes between high and low levels and to measure an edge interval of temporally adjacent same-directed edges of the input signal. The apparatus also includes an input unit designed to input the crank signal as the input signal to the edge interval measuring unit. The edge interval measuring unit measures one of edge intervals of temporally adjacent same-directed edges of the crank signal. The apparatus includes a multiplication clock signal generating unit configured to generate a multiplication clock signal including a train of clock pulses whose clock cycle is an integral number submultiple of the measured edge interval. The apparatus includes a count unit configured to count in synchronization with the multiplication clock signal, and an abnormality determining unit configured to determine whether the crank signal is abnormal. The apparatus includes a switching unit configured to switch the input signal to the edge interval measuring unit from the crank signal to the cam signal when it is determined that the crank signal is abnormal. The edge interval measuring unit measures an edge interval of temporally adjacent same-directed edges of the cam signal. The apparatus includes a count-value control unit. The count-value control unit is configured to identify the angular positions of the crankshaft based on the cam signal to initialize a count value of the count unit based on the identified angular positions of the crankshaft. The count-value control unit is configured to change the integral number based on the predetermined waveform pattern of the cam signal to shift the count value of the count unit as in the case of the crank signal inputting to the edge interval measuring unit.

According to another aspect of the present invention, there is provided a method of controlling an engine using a cam signal in addition to a crank signal. The cam signal includes a series of changes between high and low levels in a predetermined waveform pattern. Same directed edges of the changes of the cam signal correspond to angular positions of rotation of a camshaft of the engine. The crank signal includes a train of crank pulses whose same-directed edges correspond to angular positions of rotation of a crankshaft of the engine. The angular positions of rotation of the camshaft are associated with those of rotation of the crankshaft. The method includes, when receiving an input signal including a series of changes between high and low levels, measuring an edge interval of temporally adjacent same-directed edges of the input signal. The method includes inputting the crank signal as the input signal to the measuring step. The measuring step measures one of edge intervals of temporally adjacent same-directed edges of the crank signal. The method includes generating a multiplication clock signal including a train of clock pulses whose clock cycle is an integral number submultiple of the measured edge interval. The method includes counting in synchronization with the multiplication clock signal, and determining whether the crank signal is abnormal. The method includes switching the input signal to the edge interval measuring unit from the crank signal to the cam signal when it is determined that the crank signal is abnormal. The measuring step measures an edge interval of temporally adjacent same-directed edges of the cam signal. The method includes identifying the angular positions of the crankshaft based on the cam signal to initialize a count value of the count unit based on the identified angular positions of the crankshaft. The method includes changing the integral number based on the predetermined waveform pattern of the cam signal to shift the count value as in the case of the crank signal inputting to the measuring step.

BRIEF DESCRIPTION OF THE DRAWINGS

Other objects and aspects of the invention will become apparent from the following description of embodiments with reference to the accompanying drawings in which.

DETAILED DESCRIPTION OF AN EMBODIMENT OF THE INVENTION

An embodiment of the present invention will be described hereinafter with reference to the accompanying drawings. In the embodiment, the invention is applied to an engine control unit, and the engine control unit is operative to control a V-type four-cycle internal combustion engine having the first to the n-th cylinders (n is, for example, an even number) and installed in a vehicle.

Figure 1:
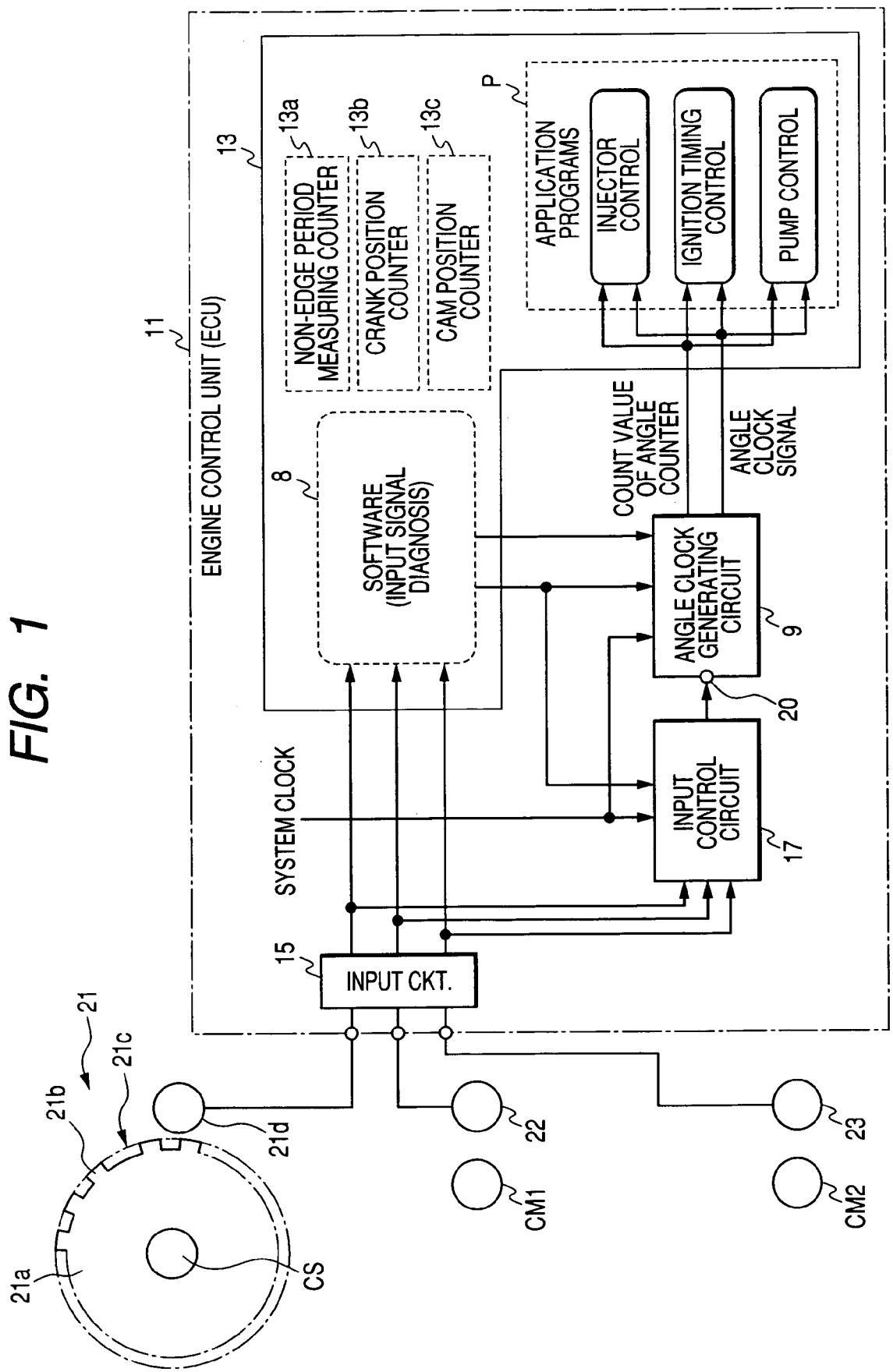
FIG. 1 is a block diagram schematically illustrating an example of the structure of an engine control unit installed in a vehicle according to an embodiment of the present invention.

FIG. 1 is a block diagram illustrating an example of the structure of an electronic control unit 1, referred to as ECU 1, which is installed in a vehicle according to an embodiment of the present invention.

Referring to FIG. 1, the ECU 1 according to the embodiment is provided with a microcomputer 13, an input circuit 15 electrically connected to the microcomputer 13, and an input control circuit 17 electrically connected to the microcomputer 13 and the input circuit 15. The ECU 1 is also provided with an angle clock generating circuit 19 having an input terminal 20 and electrically connected to the input control circuit 17 and the microcomputer 13.

The input circuit 15 is electrically connected to a crankshaft sensor 21, a first camshaft sensor 22, and a second camshaft sensor 23.

As illustrated in FIG. 1, the crankshaft sensor 21 is preferably provided with a reluctor disc 21a having a plurality of teeth 21b substantially spaced at angle intervals of, for example, 10 degrees around the periphery of the disc 21a. The reluctor disc 21a is mounted on a crankshaft CS serving as the engine's main shaft for delivering rotary motion taken from the reciprocating pistons and rods. The reluctor disc 21a has, for example, a tooth-missing portion 21c composed of, for example, two adjacent teeth missing. The tooth-missing portion 21c corresponds to a specified position of the rotational position of the crankshaft CS.

The crankshaft sensor 21 is also preferably provided with a pickup 21d operative to magnetically detect the teeth 21b of the reluctor disc 21a on the crankshaft CS as it rotates to generate a crank signal based on the detected result. The crank signal is input to the input circuit 15.

For details, the crank signal input to the input circuit 15 consists of a train of crank pulses.

Figure 4:
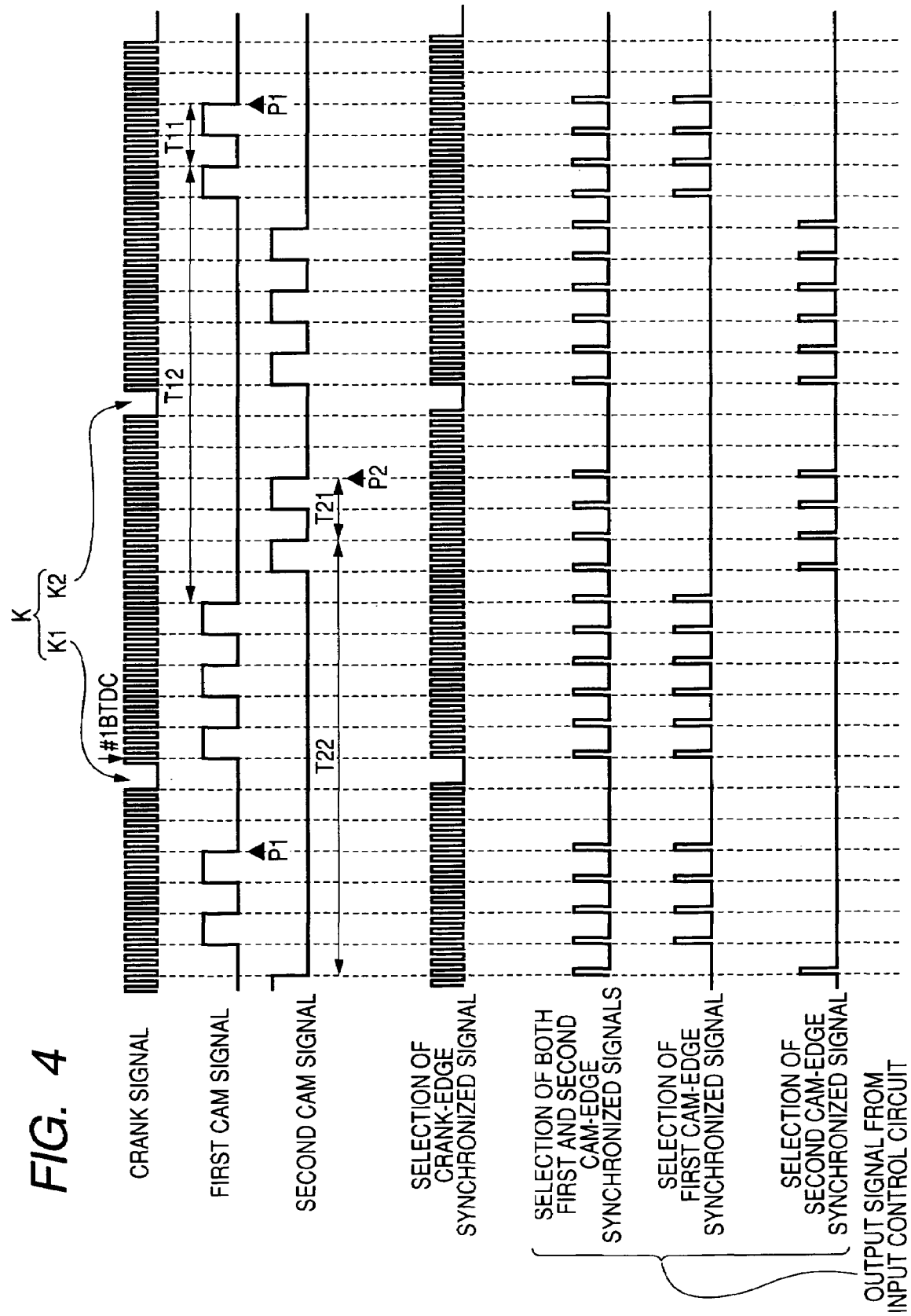
FIG. 4 is a time chart schematically illustrating crank signal, first and second cam signals, and output signals according to the embodiment of the present invention.

Specifically, as shown in FIG. 4, the crank signal continuously changes from its low level (base level) to its high level (maximum level) and then to its low level every time the reluctor disc 21a (crankshaft CS) rotates at the crank angle (CA) of 10 degrees during a first period for which the rotational position of the crankshaft CS is not located at the specified position.

On the other hand, during a second period for which the rotational position of the crankshaft CS is located at the specified position, the pulse time interval between the same-directed edges, for example, active trailing edges of temporally adjacent crank pulses is an integral multiple of the pulse time interval between the active trailing edges of temporally adjacent crank pulses during the first period. In the embodiment, the pulse time interval between the trailing edges of temporally adjacent crank pulses during the second period is three times of the pulse time interval between the trailing edges of temporally adjacent crank pulses during the first period.

Specifically, the crank signal is composed of a train of the crank pulses whose active trailing edges are spaced at time intervals each corresponding to the crank angle of 10 degrees during the first period for which the rotational position of the crankshaft is not located at the specified position.

The crank signal is also composed of pulse-missing portions K. The pulse-missing portions K correspond to the tooth-missing portions 21c of the crankshaft sensor 21, respectively. In each of the pulse-missing portions K of the crank signal, a predetermined number of crank pulses, for example two, are skipped during the second period for which the rotational position of the crankshaft CS is located at the specified position. Specifically, the pulse time interval between the trailing edges of temporally adjacent crank pulses during the second period corresponds to the crank angle of 30 degrees. The pulse-missing portions K appear once every the crank angle of 360 degrees, in other words, twice per one engine cycle (the crank angle of 720 degrees).

Specifically, the pulse-missing portions K include first pulse-missing portions K1. A first pulse-missing portion K1 starts from the trailing edge of a crank pulse at the end of a first period to the next temporally adjacent trailing edge of the next temporally adjacent crank pulse at the start of the next one. The next temporally adjacent trailing edge corresponds to a position of the crankshaft CS the crank angle of 10 degrees before TDC (Top Dead Center) of the first cylinder. The position of the crankshaft CS the crank angle of 10 degrees before TDC of the first cylinder will be referred to as #1BTDC. The crank position of the crankshaft CS corresponding to the #1BTDC is defined as a reference position.

The pulse missing portions K also include second pulse-missing portions K2. A second pulse-missing portion K2 starts from a trailing edge of a crank pulse at the end of a first period to the next temporally adjacent trailing edge of the next temporally adjacent crank pulse at the start of the next one. The next temporally adjacent trailing edge corresponds to a rotational position of the crankshaft CS the crank angle of 360 degrees (360° CA) after the #1BTDC.

The first camshaft sensor 22 is operative to magnetically detect rotational positions of a first camshaft CM1 as it rotates at one-half speed of the crankshaft CS to generate a first cam signal based on the detected result. The first cam signal is input to the input circuit 15.

Similarly, the second camshaft sensor 23 is operative to magnetically detect rotational positions of a second camshaft CM2 as it rotates at one-half speed of the crankshaft CS to generate a second cam signal based on the detected result. The second cam signal is input to the input circuit 15.

The first and second camshafts CM1 and CM2 are configured to be driven by gears, belts, or a chain from the crankshaft CS and containing a series of cams for opening and closing the intake and exhaust valves, respectively.

As illustrated in FIG. 4, the first cam signal consists of a series of transient changes between high and low levels (maximum and base levels) in response to rotation of the first camshaft CM1. Similarly, the second cam signal consists of a series of transient changes between high and low levels (maximum and base levels) in response to rotation of the second camshaft CM2.

Specifically, the first cam signal is configured to varies from the high level to the low level when the crankshaft CS is located at the crank position, which is shown in FIG. 4 by P1, the crank angle of 90 degrees before the #1BTDC, and holds the low level during a period corresponding to the crank angle of 90 degrees from the crank position P1. Thereafter, the first cam signal varies from the low level to the high level and holds the high level during a period corresponding to the crank angle of 30 degrees. Subsequently, the first cam signal varies from the high level to the low level and holds the low level during a period corresponding to the crank angle of 30 degrees, and varies from the low level to the high level and holds the high level during a period corresponding to the crank angle of 30 degrees. Thereafter, the first cam signal varies from the high level to the low level and holds the low level during a period corresponding to the crank angle of 390 degrees, and varies from the low level to the high level and holds the high level during a period corresponding to the crank angle of 30 degrees.

Thereafter, the first cam signal varies from the high level to the low level and holds the low level during a period corresponding to the crank angle of 30 degrees, and varies from the low level to the high level and holds the high level during a period corresponding to the crank angle of 30 degrees. Thereafter, the first cam signal varies from the high level to the low level when the crankshaft CS is located at the crank position P1 the crank angle of 90 degrees before the #1BTDC. The first cam signal is configured to repeat the variation set forth above depending on rotation of the first camshaft CM1 (the crankshaft CS).

The variation of the second cam signal is out of phase with that of the first cam signal by the crank angle of 360 degrees.

The crank position P1 is a reference position of the first cam signal, and the crank position the crank angle of 360 degrees apart from the reference position P1 is a reference position of the second cam signal, which will be referred to as P2.

Note that a system clock consisting of a train of periodic clock pulses is generated within the ECU 11, such as the microcomputer 13. The system clock is designed such that the clock cycle thereof is set to be sufficiently shorter than the minimum value of one pulse cycle of the crank signal; this minimum value of the pulse cycle means a time corresponds to the crank angle of 10 degrees in the case where the engine is operated at the maximum speed.

The input control circuit 17 is configured to selectively input any one of the crank signal, the first cam signal, the second cam signal, and the ORed signal of the first and second cam signals to the input terminal 20 of the angle clock generating circuit 19 depending on a control signal sent from the microcomputer 13.

Figure 2:
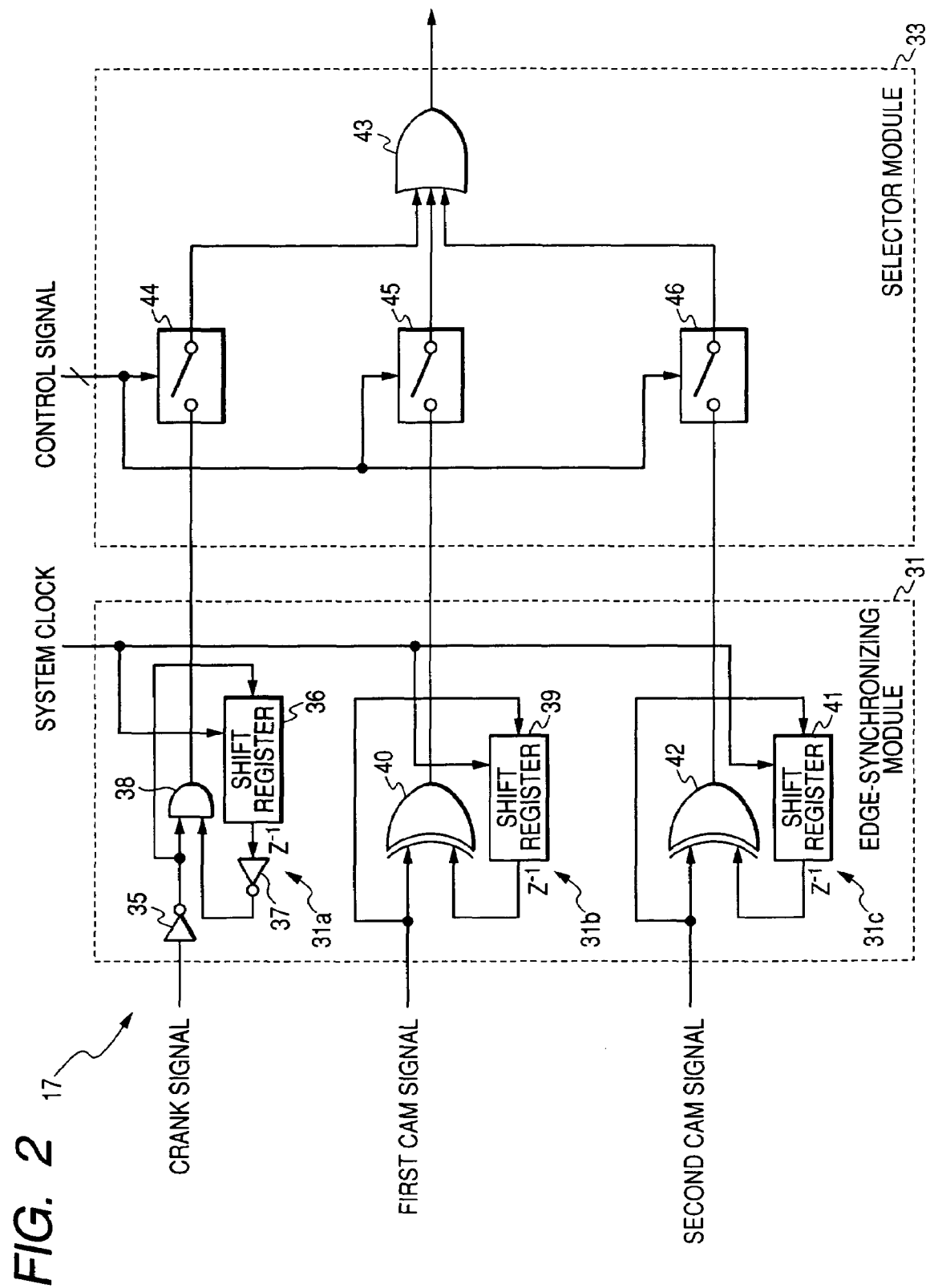
FIG. 2 is a circuit diagram schematically illustrating an example of the structure of an input control circuit illustrated in FIG. 1 according to the embodiment of the present invention.

Specifically, as illustrated in FIG. 2, the input control circuit 17 is composed of an edge-synchronizing module 31 and a selector module 33.

The edge-synchronizing module 31 has a first unit 31a operative to generate a signal with a rising edge being synchronized with an active trailing edge in the crank signal.

Specifically, the first unit 31a includes an inverter 35 operative to invert the crank signal in level to output the level-inverted crank signal, and a shift register 36 operative to store the output signal (the level-inverted crank signal) by one period of the system clock and to output the one-period delayed signal.

The first unit 31a also includes an inverter 37 operative to invert the output signal (one-period delayed signal) from the shift register 36 in level to output the level-inverted signal. The first unit 31a further includes an AND gate 38 operative to AND the output signal from the inverter 35 and that from the inverter 37 and to output the ANDed signal to the selector module 33.

As set forth above, the ANDed signal, which rises when an trailing edge appears in the crank signal and holds the high level during one period of the system clock, is output from the AND gate 38 to the selector module 33. The ANDed signal output from the AND gate 38 will be referred to as crank-edge synchronized signal.

The edge-synchronizing module 31 also has a second unit 31b operative to generate a signal with a rising edge being synchronized with a level-inversion of the first cam signal. In other words, the second unit 31b is operative to generate a signal with a riding edge being synchronized with when the first cam signal varies from one of the high and low levels to the other.

Specifically, the second unit 31b includes a shift register 39 operative to store the first cam signal by one period of the system clock and to output the one-period delayed signal. The second unit 31b also includes an Exclusive OR (XOR) gate 40 operative to XOR the output signal from the shift register 39 and the first cam signal to output the XORed signal to the selector module 33.

As set forth above, the XORed signal, which rises when a level-inversion appears in the first cam signal and holds the high level during one period of the system clock, is output from the XOR gate 40 to the selector module 33. The XORed signal output from the XOR gate 40 will be referred to as first cam-edge synchronized signal.

The edge-synchronizing module 31 further has a third unit 31c operative to generate a signal with a rising edge being synchronized with a level-inversion of the second cam signal. In other words, the third unit 31c is operative to generate a signal with a riding edge being synchronized with when the second cam signal varies from one of the high and low levels to the other.

Specifically, the third unit 31c includes a shift register 41 operative to store the second cam signal by one period of the system clock and to output the one-period delayed signal. The third unit 31c also includes an XOR gate 42 operative to XOR the output signal from the shift register 41 and the second cam signal to output the XORed signal to the selector module 33.

As set forth above, the XORed signal, which rises when a level-inversion appears in the second cam signal and holds the high level during one period of the system clock, is output from the XOR gate 42 to the selector module 33. The XORed signal output from the XOR gate 42 will be referred to as second cam-edge synchronized signal.

The selector module 33 includes an OR gate 43 with three inputs, and a first switch 44 configured to be turned on or off depending on the control signal sent from the microcomputer 13 to determine whether the crank-edge synchronized signal output from the AND gate 38 is input to the OR gate

43. The selector module 33 also includes a second switch 45 configured to be turned on or off depending on the control signal sent from the microcomputer 13 to determine whether the first cam-edge synchronized signal output from the XOR gate 40 is input to the OR gate 43. The selector module 33 further includes a third switch 46 configured to be turned on or off depending on the control signal sent from the microcomputer 13 to determine whether the second cam-edge synchronized signal output from the XOR gate 42 is input to the OR gate 43. An output signal from the OR gate 43 is configured to be input to the input terminal 20 of the angle clock generating circuit 19 as an output signal from the input control circuit 17.

In the input control circuit 17 set forth above, if the control signal causes the first switch 44 to be only turned on, the crank-edge synchronized signal is only selected to be input to the OR gate 43. This allows the crank-edge synchronized signal output from the AND gate 38 to be input to the input terminal 20 of the angle clock generating circuit 19 as the output signal from the input control circuit 17. The output signal from the input control circuit 17 in this state is represented as the "SELECTION OF CRANK-EDGE SYNCHRONIZED SIGNAL" in FIG. 4. Specifically, in this state, the crank-edge synchronized signal including timing information indicative of each trailing edge in the crank signal is selected from the crank-edge synchronized signal, and the first and second cam-edge synchronized signals to be input to the angle clock generating circuit 19.

If the control signal causes the third switch 46 to be only turned on, the second cam-edge synchronized signal is only selected to be input to the OR gate 43. This allows the second cam-edge synchronized signal output from the XOR gate 42 to be input to the input terminal 20 of the angle clock generating circuit 19 as the output signal from the input control circuit 17. The output signal from the input control circuit 17 in this state is represented as the "SELECTION OF SECOND CAM-EDGE SYNCHRONIZED SIGNAL" in FIG. 4. Specifically, in this state, the second cam-edge synchronized signal including timing information indicative of each of the rising and trailing edges in the second cam signal is selected from the crank-edge synchronized signal, and the first and second cam-edge synchronized signals to be input to the angle clock generating circuit 19.

If the control signal causes the second switch 45 to be only turned on, the first cam-edge synchronized signal is only selected to be input to the OR gate 43. This permits the first cam-edge synchronized signal output from the XOR gate 40 to be input to the input terminal 20 of the angle clock generating circuit 19 as the output signal from the input control circuit 17. The output signal from the input control circuit 17 in this state is represented as the "SELECTION OF FIRST CAM-EDGE SYNCHRONIZED SIGNAL" in FIG. 4. Specifically, in this state, the first cam-edge synchronized signal including timing information indicative of each of the rising and trailing edges in the first cam signal is selected from the crank-edge synchronized signal, and the first and second cam-edge synchronized signals to be input to the angle clock generating circuit 19.

If the control signal causes the second and third switches 45 and 46 to be only turned on, the first and second cam-edge synchronized signals are selected to be input to the OR gate 43. This allows the OR gate 43 to OR the first and second cam-edge synchronized signals output from the XOR gates 40 and 42 so that the ORed signal output from the OR gate 43 is input to the input terminal 20 of the angle clock generating circuit 19 as the output signal from the input control circuit 17. The output signal from the input control circuit 17 in this state is represented as the "SELECTION OF BOTH FIRST AND SECOND CAM-EDGE SYNCHRONIZED SIGNALS" in FIG. 4. Specifically, in this state, the ORed signal including timing information indicative of each of the rising and trailing edges in each of the first and second cam signals is input to the angle clock generating circuit 19.

Note that each of periods for which the output signals from the input control circuit 17 are in the high level is equivalent to one clock cycle of the system clock, and one clock cycle of the system clock is sufficiently shorter than one pulse cycle of the crank signal. In FIG. 4, however, each period for which the output signal from the input control circuit 17 is in the high level is illustrated to be longer than it really is because of easily illustrating the relationship between the crank signal, the first and second cam signals, and the output signals from the input control circuit 17.

Moreover, a reason for output of the ORed signal of the first and second cam-edge synchronized signals by the input control circuit 17 is as follows.

Specifically, it is assumed that the input control circuit 17 merely outputs an ORed signal of the first and second cam signals. In this assumption, if periods for which the first and second cam signals are in the high levels are superimposed on each other, part of timing information indicative of some of the rising and trailing edges in the first and second cam signals may be deleted. The input control circuit 17 therefore outputs the ORed signal of the first and second cam-edge synchronized signals in order to prevent some of the rising and trailing edges in the first and second cam signals from being deleted.

The microcomputer 13 includes a memory that has stored therein software S consisting of the sets of programs. The software S (the sets of programs) causes the microcomputer 13 to individually diagnose whether the crank signal, the first cam signal, and the second cam signal are normally input to the ECU 11, and to individually switch the on/off state of each of the first to third switches 44 to 46 based on the diagnosed result.

Specifically, if it is determined that the crank signal is normally input to the ECU 11, the microcomputer 13 only turns the first switch 44 on, permitting the crank-edge synchronized signal output from the input control circuit 17 to be input to the input terminal 20 of the angle clock generating circuit 19.

If it is determined that the first and second cam signals are normally input to the ECU 11 but the crank signal is not, the microcomputer 13 turns both the second and third switches 45 and 46 on with the first switch being in off state. This permits the ORed signal of the first and second cam-edge synchronized signals output from the input control circuit 17 to be input to the input terminal 20 of the angle clock generating circuit 19.

When it is determined that the crank signal and the second cam signal are abnormally input to the ECU 11 but the first cam signal is normally input thereto, the microcomputer 13 only turns the second switch 45 on. This permits the first cam-edge synchronized signal output from the input control circuit 17 to be input to the input terminal 20 of the angle clock generating circuit 19.

If it is determined that the crank signal and the first cam signal are abnormally input to the ECU 11 but the second cam signal is normally input thereto, the microcomputer 13 only turns the third switch 46 on. This permits the second cam-edge synchronized signal output from the input control circuit 17 to be input to the input terminal 20 of the angle clock generating circuit 19.

The switching operations of the output signals from the input control circuit 17 by the microcomputer 13 in accordance with the sets of programs will be described hereinafter in detail with reference to FIGS. 5 and 6.

The angle clock generating circuit 19 is operative to receive a signal input to the input terminal 20 as an input signal. The angle clock generating circuit 19 is operative to generate an angle clock signal consisting of a train of clock pulses whose clock cycle corresponds to a constant crank angle smaller than the crank angle corresponding to a time interval between active adjacent trailing edges of the crank pulses of the crank signal. In the embodiment, the constant crank angle corresponding to the clock cycle of the angle clock signal is set to the crank angle of 1 degree, which is smaller than the crank angle of 10 degrees corresponding to the time interval between active adjacent trailing edges of crank pulses of the crank signal.

Moreover, the angle clock generating circuit 19 is operative to cause an angular counter indicative of the crank position of the crankshaft CS to count up in synchronization with the angle clock signal with the resolution of the crank angle of 1 degree.

Figure 3:
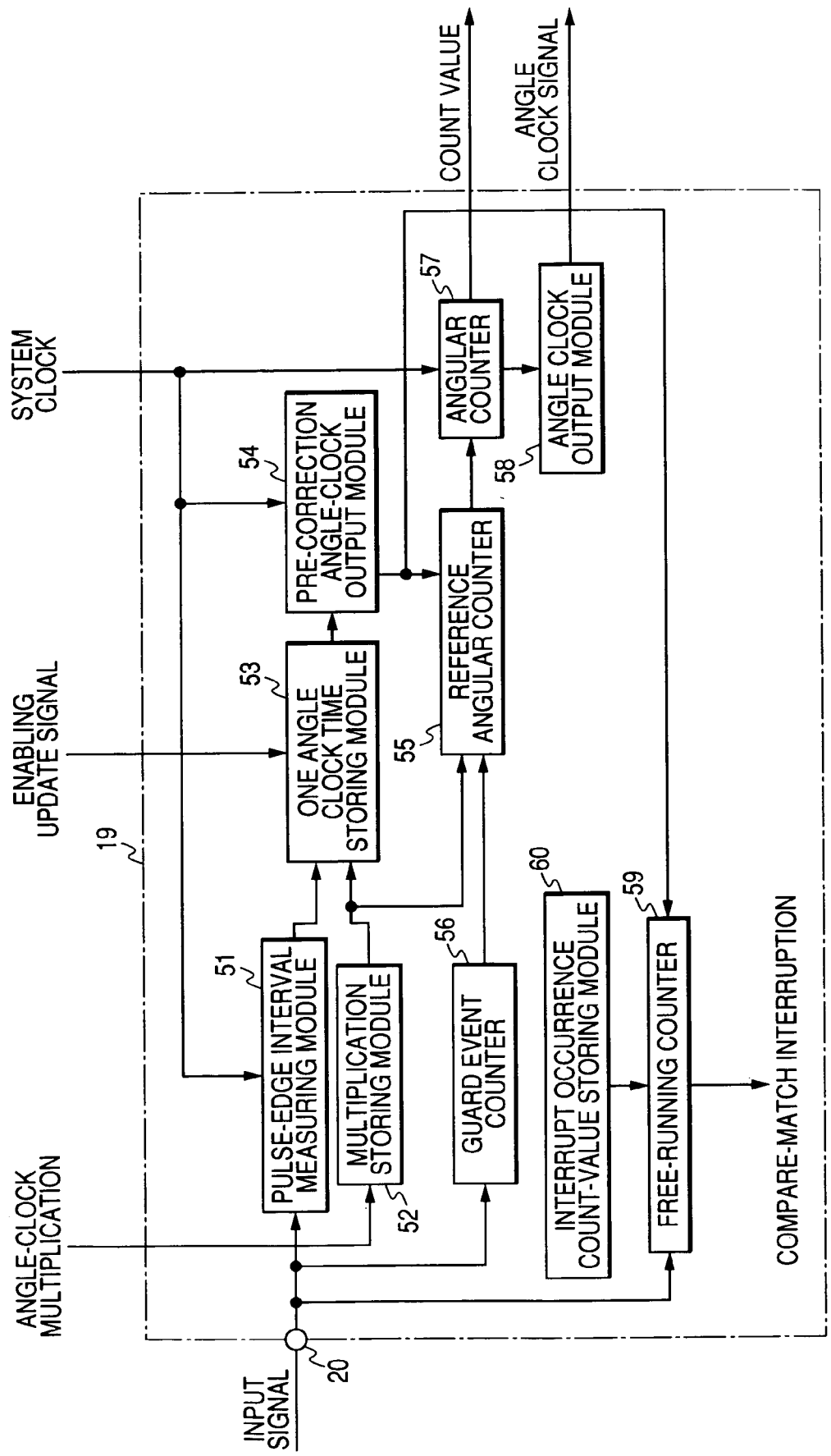
FIG. 3 is a circuit diagram schematically illustrating an example of the structure of an angle clock generating circuit illustrated in FIG. 1 according to the embodiment of the present invention.

Specifically, as illustrated in FIG. 3, the angle clock generating circuit 19 includes a pulse-edge interval measuring module 51 operative to measure a pulse-edge interval between same-directed edges, such as active rising edges, of temporally adjacent pulses in the input signal. The angle clock generating circuit 19 also includes a multiplication storing module 52 operative to have stored therein an angle-clock multiplication (a positive integer) determined by, for example, the software S of the microcomputer 13.

Furthermore, the angle clock generating circuit 19 includes a one angle-clock time storing module 53 operative to store therein an one angle-clock time obtained by dividing a measured pulse-edge interval by the angle-clock multiplication.

In addition, the angle clock generating circuit 19 includes a pre-correction angle-clock output module 54 operative to output a clock pulse of a pre-correction angle clock signal whose clock cycle corresponds to the obtained one angle-clock time stored in the one angle-clock time storing module 53.

The pulse-edge interval measuring module 51 measures a pulse-edge interval between active rising edges of temporally adjacent pulses in the input signal in synchronization with the system clock. Specifically, the pulse-edge interval measuring module 51 counts, as a pulse-edge interval, the number of the clock pulses of the system clock appearing between active rising edges of temporally adjacent pulses in the input signal.

The pre-correction angle-clock output module 54 measures a one angle-clock time, in other words, a clock cycle of the pre-correction angle clock signal, stored in the one angle-clock time storing module 53. Specifically, the pre-correction angle-clock output module 54 outputs a clock pulse of the pre-correction angle clock signal each time the number of the clock pulses of the system clock corresponding to a value (one angle-clock time) stored in the one angle-clock time storing module 53 appears.

The value stored in the one angle-clock time storing module 53 is automatically updated each time the input signal from the input terminal 20 rises. The software S of the microcomputer 13 is operative to send an enabling update signal to the one angle-clock time storing module 53. The enabling update signal allows switching of whether to carry out the automatic updating.

In addition, the angle clock generating circuit 19 includes a reference angular counter 55 configured to count up by, for example, 1 in synchronization with the pre-correction angle clock signal as clock source. The angle clock generating circuit 19 also includes a guard event counter 56 for guarding an upper limit value of the reference angular counter 55.

Moreover, the angle clock generating circuit 19 includes an angular counter 57 operative to cause its count value to automatically follow the count value of the reference counter 55 in synchronization with the system clock. The angle clock generating circuit 19 also includes an angle-clock output module 58 operative to output a clock pulse in the angle clock signal in synchronization with each count-up of the angular counter 57.

The guard event counter 56 is incremented each time the input signal sent from the input terminal 20 rises. The upper limit value of the reference angular counter 55 cannot exceed a guard value given by the product of the count value of the guard event counter 56 and the angle-clock multiplication stored in the multiplication storing module 52.

The angular counter 57 is a counter whose count value represents the crank position of the crankshaft with the resolution of the crank angle of 1 degree. Specifically, the angular counter 57 counts up in synchronization with the system clock when its count value is smaller than the count value of the reference angular counter 55 so that it automatically stops when its count value coincides with the count value of the reference angular counter 55. For this reason, the angular counter 57 basically carries out count-up operations in response to the pre-correction angle clock signal. A count-up timing of the angular counter 57 is synchronized with an output timing of a clock pulse in the system clock after change of the count value of the reference angular counter 55. Specifically, the angular counter 57 is configured such that a change timing of its count value is synchronized with the system clock. The angle clock is output from the angle clock output module 58 in synchronization with each count-up of the angular counter 57.

Still furthermore, the angle clock generating circuit 19 includes a free-running counter 59 designed to:

count from zero to a predetermined value in synchronization with the system clock;

then roll over to zero; and begin counting again.

The free-running counter 59 is also designed to be cleared each time the input signal sent from the input terminal 20 rises.

In addition, the angle clock generating circuit 19 includes an interrupt occurrence count-value storing module 60. The interrupt occurrence count-value storing module 60 has stored therein a predetermined interruption occurrence count-value. Coincidence of the count value of the free-running counter 59 with the interruption occurrence count-value stored in the storing module 60 allows a compare-match interruption request to the microcomputer 13 to be generated.

In addition, the microcomputer 13 includes a non-edge period measuring counter 13a with an initial count value of zero for measuring a non-edge period in the crank signal, and the first and second cam signals. The microcomputer 13 also includes a crank position counter 13b configured to count up by the crank angle of 10 degrees in synchronization with the crank signal. Moreover, the microcomputer 13 includes a cam position counter 13c configured to count up by the crank angle of 30 degrees for representing the rotational positions of the first and second camshaft CM1 and CM2. In other words, the cam position counter 13c represents the crank position identified by the first or second cam signal with the resolution of the crank angle of 30 degrees.

The counters 13a to 13c can be implemented by hardware components of the computer 13 or software being installed therein.

The memory of the microcomputer 13 has stored therein application programs (crank-signal synchronized control programs) P. The application programs P cause the microcomputer 13 to:

grasp the crank position of the crankshaft CS based on the count value of the angular counter 57; and carry out engine control, such as injector control (fuel injection control), ignition timing control, and pump control using the grasped crank position (count value).

For example, the microcomputer 17 can continue to output a drive signal to an actuator until the count value of the angular counter 57 rises from a given value to another value. Moreover, the microcomputer 17 can continue to output a drive signal to an actuator until a predetermined period of time has elapsed from when the count value of the angular counter 57 reaches a given value.

When the engine suddenly decelerates during an arbitral pulse cycle (pulse time interval) in the input signal, the angle clock generating circuit 19 permits the count value of the angular counter 57 to be terminated at the guard value of the guard event counter 56 until the next riding edge is generated in the input signal. This makes it possible to prevent the count value of the angular counter 57 from being shifted to be large from the angle-clock multiplication.

When the engine suddenly accelerates during an arbitral pulse cycle in the crank signal, the angle clock generating circuit 19 permits the count value of the angular counter 57 to be forcibly incremented in synchronization with the system clock. This allows the count value of the angular counter 57 to be reached up to the guard value set at the current rising edge in the input signal.

That is, the angle clock generating circuit 19 can prevent dropouts of the operations, such as injecting operation, igniting operation, and the like, being synchronized with change of the count value of the angular counter 57. The structure and the operations of the angle clock generating circuit 19 are taught in Japanese Unexamined Patent Publication No. 2001-200747 and U.S. Pat. No. 6,445,998B1 corresponding to Japanese Unexamined Patent Publication No. 2001-214790, and therefore the disclosure of which is incorporated totally herein by reference.

Next, operations executed by the microcomputer 13 will be described hereinafter.

Figure 5:
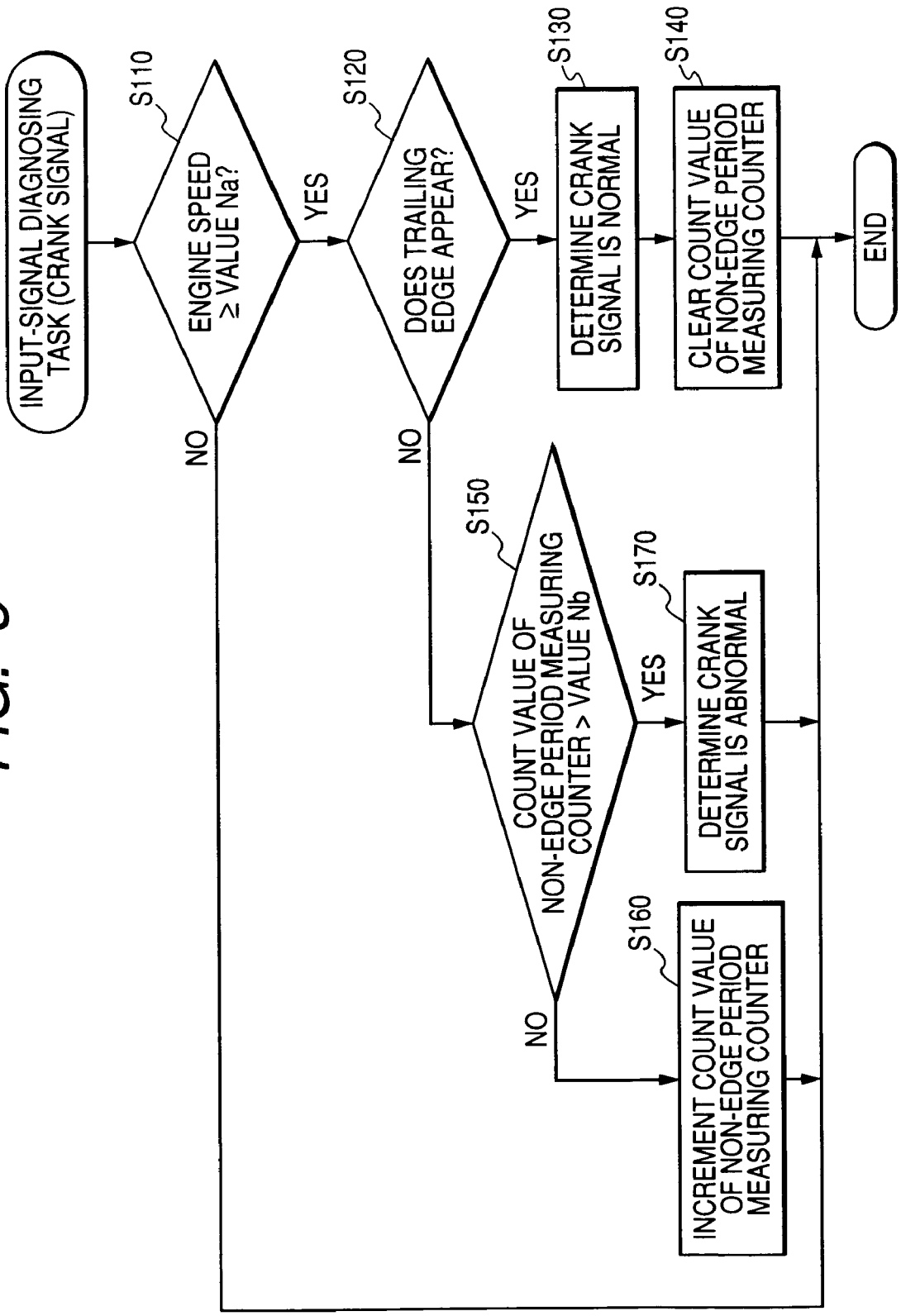
FIG. 5 is a flowchart schematically illustrating an input-signal diagnosing task for the crank signal as an input signal to the angle clock circuit according to the embodiment of the invention.

FIG. 5 is a flowchart schematically illustrating an input-signal diagnosing task for the crank signal as the input signal in accordance with the software S. The input-signal diagnosing task is executed by the microcomputer 13 at regular time intervals of Tc as a time-synchronized task in accordance with the software S.

Specifically, when starting to execute the input-signal diagnosing task, in step S110, the microcomputer 13 determines whether the engine speed is equal to or greater than a predetermined value Na. If it is determined that the engine speed is less than the predetermined value (the determination in step S110 is NO), the microcomputer 13 exits the input-signal diagnosing task.

In step S110, the engine speed can be calculated by predetermined engine speed calculating operations using the crank angle. For example, the microcomputer 13 measures the time interval of the crank angle of 360 degrees corresponding to the occurrence cycle of the pulse missing portions K, and calculates the engine speed based on the measured time interval. The pulse missing portions K can be detected in, for example, the following manner. Specifically, intervals between trailing edges between temporally adjacent crank pulses are measured, and when a current measured interval is more than the product of a previous measured interval and a predetermined pulse-missing detecting ratio of, for example, 2, it is determined that the current measured interval corresponds to one of the pulse missing portions K.

In contrast, if it is determined that the engine speed is equal to or greater than the predetermined value Na (the determination in step S110 is YES), the microcomputer 13 proceeds to step S120. In step S120, the microcomputer 13 determines whether an active trailing edge appears in the crank signal during a regular time interval Tc from the previous input-signal diagnosing task to this current input-signal diagnosing task.

If it is determined that an active trailing edge appears in the crank signal during the regular time interval Tc (the determination in step S120 is YES), the microcomputer 13 stores in the memory information representing that the crank signal is normal as the diagnosed result in step S130. Then, the microcomputer 13 clears the count value of the non-edge period measuring counter 13a in step S140, exiting the input-signal diagnosing task.

In step S120, if it is determined that no active trailing edge appears in the crank signal during the regular time interval Tc (the determination in step S120 is NO), in step S150, the microcomputer 13 determines whether the count value of the non-edge period measuring counter 13a exceeds a predetermined value Nb.

If it is determined that the non-edge period measuring counter 13a does not exceed the predetermined value Nb (the determination in step S150 is NO), the microcomputer 13 increments the count value of the non-edge period measuring counter 13a, exiting the input-signal diagnosing task.

When it is determined that the non-edge period measuring counter 13a exceeds the predetermined value Nb (the determination in step S150 is YES), the microcomputer 13 stores in the memory information representing that the crank signal is abnormal as the diagnosed result in step S170, exiting the input-signal diagnosing task.

Specifically, in the input-signal diagnosing task shown in FIG. 5, when the engine speed is equal to or greater than the predetermined value Na (the determination in step S110 is YES), if no active trailing edge appears in the crank signal after a predetermined period of time has elapsed (the determinations in steps S120 and S150 are NO), the crank signal is determined to be abnormal (see step S170). Note that the predetermined period of time is represented as the product of the regular time interval Tc and the predetermined value Nb (Tc×Nb), and that an active trailing edge is supposed to appear in the crank signal during the predetermined period of time.

Similarly, the microcomputer 13 carries out the input-signal diagnosing task illustrated in FIG. 5 for the first and second cam signals as the input signal, thereby determining whether the first and second cam signals are normal.

Figure 6:
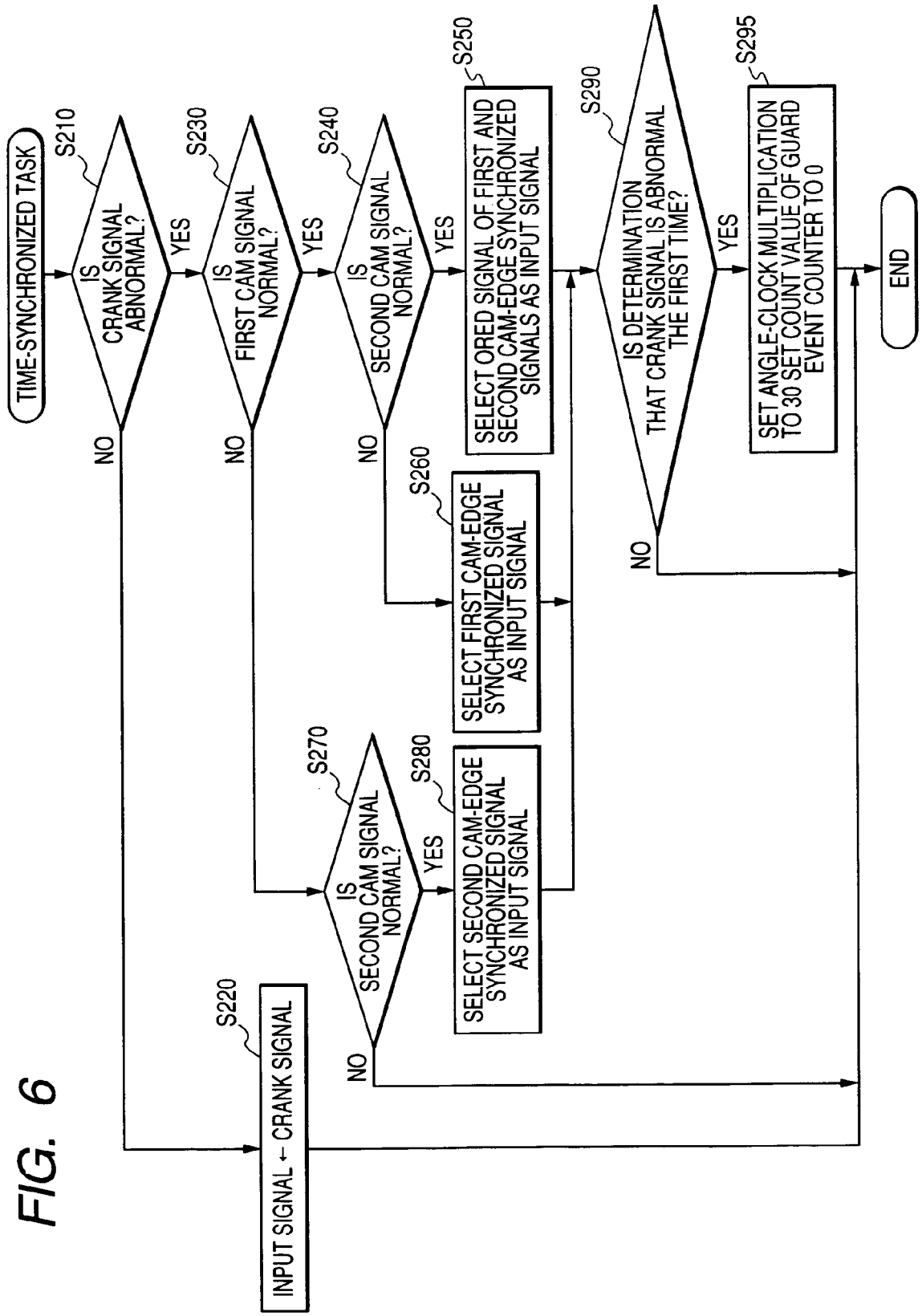
FIG. 6 is a flowchart schematically illustrating a time-synchronized task according to the embodiment of the invention.

Next, FIG. 6 is a flowchart schematically illustrating a time-synchronized task for selecting any one of the crank-edge synchronized signal, the first cam-edge synchronized signal, the second cam-edge synchronized signal, and the ORed signal of the first and second cam-edge synchronized signals. The time-synchronized task is executed by the microcomputer 13 at regular time intervals concurrently with the input-signal diagnosing task in accordance with the software S.

When starting to execute the time-synchronized task, in step S210, the microcomputer 13 refers to the information stored in the memory and representing the diagnosed result for the crank signal to determine whether the crank signal is abnormal based on the referred result.

If it is determined that the crank signal is normal (the determination in step S210 is NO), the microcomputer 13 proceeds to step S220 to send, to each of the first to third switches 44 to 46, the control signal for causing the first switch 44 to be only turned on, exiting the time-synchronized task. This allows the crank-edge synchronized signal to be selected as the input signal to the angle clock generating circuit 19.

If it is determined that the crank signal is abnormal (the determination in step S210 is YES), the microcomputer 13 proceeds to step S230. In step S230, the microcomputer 13 refers to the information stored in the memory and representing the diagnosed result for the first cam signal to determine whether the first cam signal is normal based on the referred result.

If it is determined that the first cam signal is normal (the determination in step S230 is YES), the microcomputer 13 proceeds to step S240. In step S240, the microcomputer 13 refers to the information stored in the memory and representing the diagnosed result for the second cam signal to determine whether the second cam signal is normal based on the referred result in step S240.

If it is determined that the second cam signal is normal (the determination in step S240 is YES), the microcomputer 13 proceeds to step S250. In step S250, the microcomputer 13 sends, to each of the first to third switches 44 to 46, the control signal for causing both the second and third switches 45 and 46 to be turned on with the first switch 44 being in off state, going to step S290. This allows the ORed signal of the first and second cam-edge synchronized signals to be selected as the input signal to the angle clock generating circuit 19.

In contrast, when it is determined that the second cam signal is abnormal (the determination in step S240 is NO), the microcomputer 13 proceeds to step S260. In step S260, the microcomputer 13 sends, to each of the first to third switches 44 to 46, the control signal for causing the second switch 45 to be only turned on, going to step S290. This allows the first cam-edge synchronized signal to be selected as the input signal to the angle clock generating circuit 19.

When it is determined that the first cam signal is abnormal (the determination in step S230 is NO), the microcomputer 13 proceeds to step S270. In step S270, like step S240, the microcomputer 13 refers to the information stored in the memory and representing the diagnosed result for the second cam signal to determine whether the second cam signal is normal based on the referred result.

If it is determined that the second cam signal is normal (the determination in step S270 is YES), the microcomputer 13 proceeds to step S280. In step S280, the microcomputer 13 sends, to each of the first to third switches 44 to 46, the control signal for causing the third switch 46 to be only turned on, going to step S290. This allows the second cam-edge synchronized signal to be selected as the input signal to the angle clock generating circuit 19.

If it is determined that the second cam signal is abnormal (the determination in step S270 is NO), the microcomputer 13 determines that both the first and second cam signals are abnormal, thereby exiting the time-synchronized task.

On the other hand, in step S290 to which the microcomputer 13 shifts from steps S250, S260, and S280, the microcomputer 13 determines whether the determination that the crank signal is abnormal in step S210 is the first time. If it is determined that the determination that the crank signal is abnormal in step S210 is not the first time, then the microcomputer 13 exits the time-synchronized task.

In contrast, if it is determined that the determination that the crank signal is abnormal in step S210 is the first time, the microcomputer 13 shifts to step S295. In step S295, the microcomputer 13 sets the angle-clock multiplication stored in the multiplication storing module 52 to, for example, 30, sets the count value of the guard event counter 56 to zero, and thereafter, exits the time-synchronized task. Note that, if the crank signal is normal, the initial value of the angle-clock multiplication stored in the multiplication storing module 52 has been set to 10 (normal value).

Figure 7:
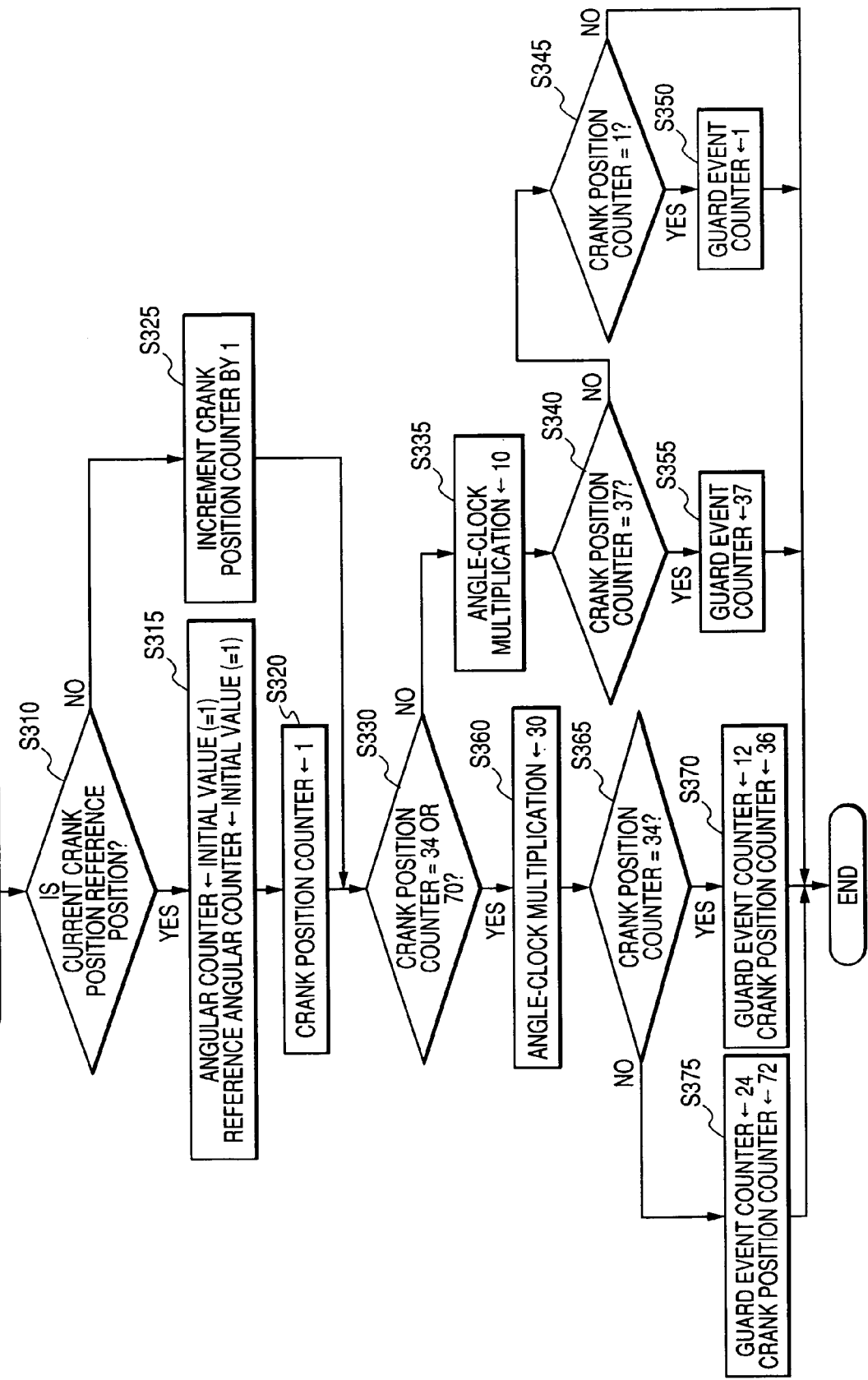
FIG. 7 is a flowchart schematically illustrating an angle-counter control task for changing a count value of an angular counter according to the embodiment of the invention.

Next, FIG. 7 is a flowchart schematically illustrating an angle-counter control task for changing the count value of the angular counter 57 by the crank angle of 1 degree based on the crank signal. The angle-counter control task is an interrupt service that is restarted each time a trailing edge appears in the crank signal in accordance with the software S.

When starting to execute the angle-counter control task based on the crank signal, in step S310, the microcomputer 13 determines whether the current crank position corresponding to a current trailing edge of the crank signal is located at the reference position (#1BTDC).

In step S310, for example, when detecting a pulse-missing portion K, the microcomputer 13 determines whether an edge (rising edge or trailing edge) appears in the first cam signal between the point of time corresponding to the crank angle of 120 degrees before the pulse-missing portion detecting timing and the point of time corresponding to the pulse-missing portion detecting timing. When it is determined that an edge appears in the first cam signal, the microcomputer 13 determines that the currently detected one of the pulse-missing portions K is one of the first pulse missing portions K1, and therefore, determines that the current crank position corresponds to the reference position (#1BTDC).

When it is determined that the current crank position corresponds to the reference position (#1BTDC) (the determination in step S310 is YES), the microcomputer 13 initializes the count values of the reference angular counter 55 and the angular counter 57 to an initial value corresponding to the #1BTDC, such as "1" in step S315. Subsequently, in step S320, the microcomputer 13 initializes the count value of the crank position counter 13b, which counts up by the crank angle of 10 degrees, to "1", proceeding to step S330.

If it is determined that the current crank position is not the reference position of the crank signal (the determination in step S310 is NO), the microcomputer 13 jumps to step S325 and increments the count value of the crank position counter 13b by 1, going to step S330.

In step S330, the microcomputer 13 determines whether the count value of the crank position counter 13b is 34 or 70 corresponding to the start position of one of the first pulse missing portions K1 or one of the second pulse missing portions K2. If it is determined that the count value of the crank position counter 13b is not 34 or 70 (the determination in step S330 is NO), the microcomputer 13 proceeds to step S335 and sets the angle-clock multiplication stored in the multiplication storing module 52 to 10 as the normal value.

After the operation in step S335, the microcomputer 13 determines whether the count value of the crank position counter 13b is 37 in step S340. If it is determined that the count value of the crank position counter 13b is not 37 (the determination in step S340 is NO), the microcomputer 13 proceeds to step S345 and determines whether the count value of the crank position counter 13b is 1 in step S345. When it is determined that the count value of the crank position counter 13b is not 1 (the determination in step S345 is NO), then the microcomputer 13 exits the angular counter control process.

In contrast, when it is determined that the count value of the crank position counter 13b is 1 (the determination in step S345 is YES), the microcomputer 13 proceeds to step S350 and then sets the count value of the guard event counter 56 to 1, exiting the angular counter control process.

If it is determined that the count value of the crank position counter 13b is 37 (the determination in step S340 is YES), the microcomputer 13 shifts to step S355, and sets the count value of the guard event counter 56 to 37, exiting the angular counter control process.

On the other hand, when it is determined that the count value of the crank position counter 13b is 34 or 70 (the determination in step S330 is YES), the microcomputer 13 shifts to step S360, and then sets the angle-clock multiplication stored in the multiplication storing module 52 to 30 three times as great as 10 (normal value).

After the operation in step S360, the microcomputer 13 proceeds to step S365 and determines whether the count value of the crank position counter 13b is 34 in step S365. If it is determined that the count value of the crank position counter 13b is 34 (the determination in step S365 is YES), the microcomputer 13 proceeds to step S370. In step S370, the microcomputer 13 sets the count value of the guard event counter 56 to 12, and sets the count value of the crank position counter 13b to 36, exiting the angular counter control process.

When it is determined that the count value of the crank position counter 13b is not 34 but 70 (the determination in step S365 is NO), the microcomputer 13 shifts to step S375. In step S375, the microcomputer 13 sets the count value of the guard event counter 56 to 24, and sets the count value of the crank position counter 13b to 72, exiting the angular counter control process.

Specifically, when the crank signal is normally input to the ECU 11, the time-synchronized task illustrated in FIG. 6 allows the crank-edge synchronized signal to be input to the angle clock generating circuit 19 from the input control circuit 17. As a result, the angular counter control task illustrated in FIG. 7 allows the count value of the angular counter 57 to vary illustrated in FIG. 8.

Figure 8:
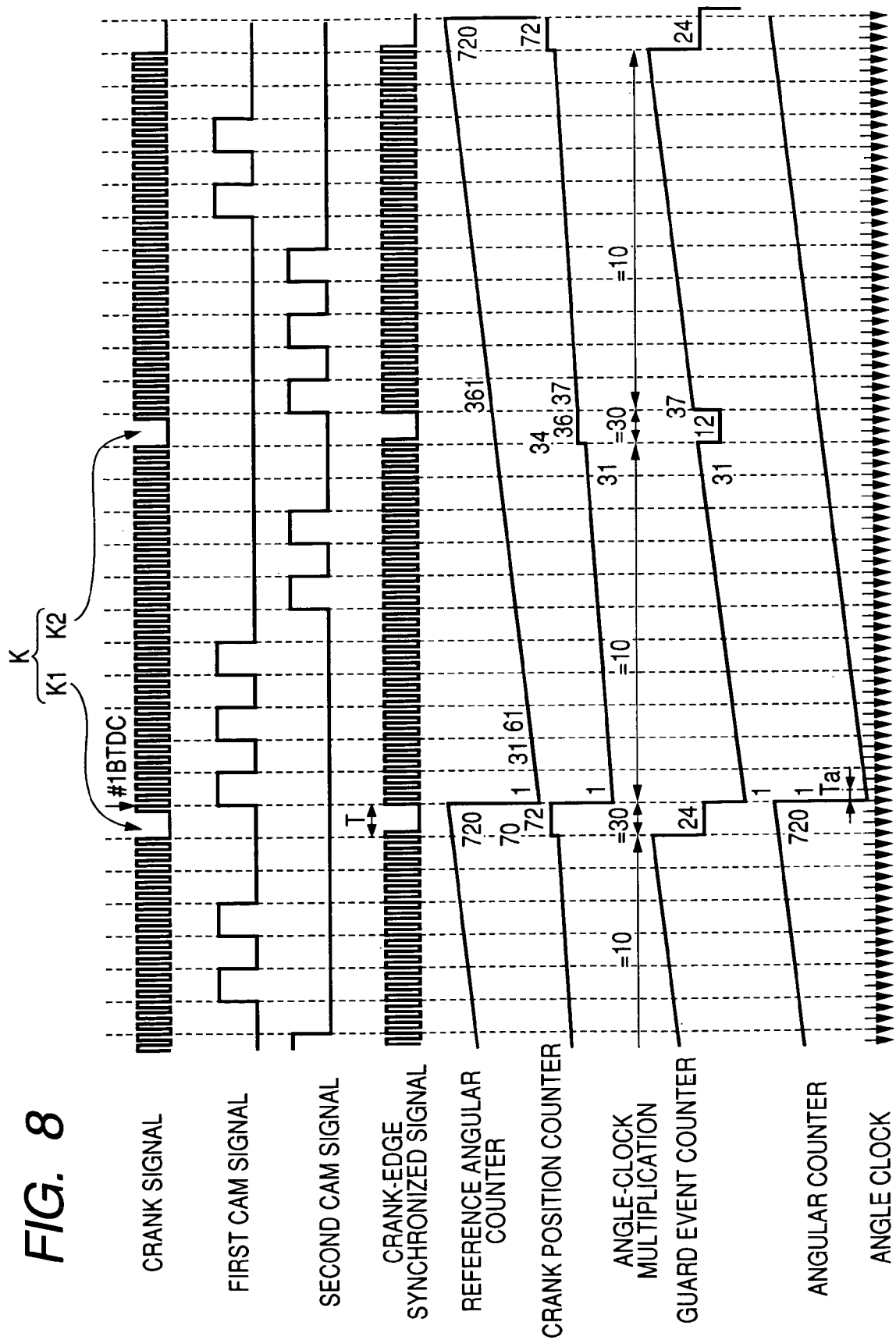
FIG. 8 is a time chart schematically illustrating the crank signal, the first and second cam signals, and the output signals, and changes of count values of the counters according to the embodiment of the present invention.

As illustrated in FIG. 8, when the crank position reaches the #1BTDC as the reference position in one cycle (the crank angle of 720 degrees) of the engine, the operations of the microcomputer 13 in steps S315 and S320 permit the count values of the reference angular counter 55, angular counter 57, and the crank position counter 13b to be initialized to 1. In addition, the operation of the microcomputer 13 in step S335 sets the angle-clock multiplication stored in the multiplication storing module 52 to 10. Moreover, the operation of the microcomputer 13 in step S350 initializes the count value of the guard event counter 56 to 1.

Thereafter, the crank position counter 13b counts up by 1 every time the crank signal falls based on the operation of the microcomputer 13 in step S325. Operations of the microcomputer 13 during the time interval between the timing of #1BTDC and the timing when the crank signal firstly falls after the timing of #1BTDC, in other words, the time interval for which the count value of the crank position counter 13b shifts to 2 from 1 will be described hereinafter.

After the count value of the crank position counter 13b reaches 2, a clock pulse of the pre-correction angle clock signal is output from the pre-correction angle-clock output module 54 every time of "Tp/10" stored in the one angle-clock time storing module 53 as the one angle-clock time. The Tp represents a pulse-edge interval between temporally adjacent active trailing edges in the crank signal, which is measured by the pulse-edge interval measuring module 51 every crank angle of 10 degrees change. The "10" represents the angle-clock multiplication set by the operation of the microcomputer 13 in step S335. Specifically, the Tp/10 corresponds to a time interval corresponding to the crank angle of 1 degree.

The count value of the reference angular counter 55 is incremented by 1 in synchronization with each clock pulse of the pre-correction angle clock, and the count value of the angular counter 57 follows the count value of the reference counter 55 so as to be incremented by 1. This allows a clock pulse in the angle clock signal to be output from the angle clock output module 58 in synchronization with each count-up of the angular counter 57. In other words, this allows a clock pulse in the angle clock signal to be output from the angle clock output module 58 every time interval corresponding to the crank angle of 1 degree.

Moreover, the count value of the guard event counter 56 is incremented by 1 every time the crank signal falls (the crank-edge synchronized signal input to the angle clock generating circuit 19 rises). This allows the count values of the reference angular counter 55 and the angular counter 57 not to exceed the guard value based on the count value of the guard event counter 56 that the count values of the counters 55 and 57 should take at the trailing timing of a next crank pulse in the crank signal (the riding edge of a next crank pulse in the crank-edge synchronized signal).

When the count value of the crank position counter 13b reaches 34 corresponding to the crank position of the crankshaft CS the crank angle of 330 degrees after the #1BTDC, in other words, the start position of one of the second pulse missing portions K2, the operation of the microcomputer 13 in step S360 sets the angle-clock multiplication stored in the multiplication storing module 52 to 30. In addition, the operation of the microcomputer 13 in step S370 increments the count value of the crank position counter 13b by 2 corresponding to the two pulse-missing so that the count value of the crank position counter 13b is corrected to 36. Moreover, the operation of the microcomputer 13 in step S370 corrects the count value of the guard event counter 56 to 12. The correction is required due to change of the angle-clock multiplication from 10 to 30, and required to set the guard value to 360 during the time interval corresponding to one of the second pulse missing portions K2.

Note that, even if the angle-clock multiplication is changed to 30 by the operation of the microcomputer 13 in step S360, the one angle-clock time (Tp/10) stored in the one angle-clock time storing module 53 is updated in synchronization with only the trailing edge of a next crank pulse in the crank signal (the riding edge of a next crank pulse of the crank-edge synchronized signal). For this reason, count-up of each of the reference angular counter 55 and the angular counter 57 and output of the angle clock from the angular counter 57 are carried out every time of Tp/10, respectively.

Thereafter, the count value of the crank position counter 13b reaches 37 based on the operation of the microcomputer 13 in step S325; this 37 corresponds to the end position of one of the second pulse missing portions K2, in other words, the crank position of the crankshaft CS the crank angle of 360 degrees after the #1BTDC. In this state, the operation of the microcomputer 13 in step S335 allows the angle-clock multiplication stored in the multiplication storing module 52 to be returned to 10. In addition, the operation of the microcomputer 13 in step S355 sets the count value of the guard event counter 56 to 37 in order to set the guard value to 370 until the trailing edge of a next crank pulse in the crank signal (the riding edge of a next crank pulse in the crank-edge synchronized signal) appears.

For a time interval between the end position of one of the second pulse missing portions K2 and the trailing edge of a next crank pulse in the crank signal, the value obtained by dividing a pulse edge interval corresponding to one of the second pulse missing portions K2 and measured by the measuring module 51 by 30 has been stored in the one angle clock time storing module 53 as the one angle-clock time corresponding to the crank angle of 1 degree. For this reason, count-up of each of the reference angular counter 55 and the angular counter 57 and output of the angle clock from the angular counter 57 are carried out every time of Tp/30 during the time interval between the end position of one of the second pulse missing portions K2 and the trailing edge of a next crank pulse, respectively.

Next, after the count value of the crank position counter 13b reaches 38 in synchronization with the trailing edge of the next crank pulse in the crank signal based on the operation of the microcomputer 13 in step S325, count-up of each of the reference angular counter 55 and the angular counter 57 and output of the angle clock from the angular counter 57 are repeatedly carried out every time of Tp/10, respectively. In addition, after the count value of the crank position counter 13b reaches 38 based on the operation of the microcomputer 13 in step S325, the count value of the guard event counter 56 is incremented by 1 every time the crank signal falls (the crank-edge synchronized signal rises).

This allows the count values of the reference angular counter 55 and the angular counter 57 not to exceed the guard value based on the count value of the guard event counter 56 that the cont values of the counters 55 and 57 should take at the trailing timing of a next crank pulse in the crank signal (the riding edge of a next crank pulse in the crank-edge synchronized signal). Moreover, the count value of the crank position counter 13b is incremented by 1 in synchronization with each trailing edge of the crank signal (each rising edge of the crank-edge synchronized signal) based on the operation of the microcomputer 13 in step S325.

When the count value of the crank position counter 13b reaches 70 corresponding to the crank position of the crankshaft CS the crank angle of 30 degrees before the #1BTDC, in other words, the start position of one of the first pulse missing portions K1, the operation of the microcomputer 13 in step S360 sets the angle-clock multiplication stored in the multiplication storing module 52 to 30. In addition, the operation of the microcomputer 13 in step S375 increments the count value of the crank position counter 13b by 2 corresponding to the two pulse-missing so that the count value of the crank position counter 13b is corrected to 72. Moreover, the operation of the microcomputer 13 in step S375 corrects the count value of the guard event counter 56 to 24. The correction is required due to change of the angle-clock multiplication from 10 to 30, and required to set the guard value to 720 during the time interval corresponding to one of the first pulse missing portions K1.

Note that, even if the angle-clock multiplication is changed to 30 by the operation of the microcomputer 13 in step S360, the one angle-clock time (Tp/10) stored in the one angle-clock time storing module 53 is updated in synchronization with only the trailing edge of a next crank pulse in the crank signal (the riding edge of a next crank pulse of the crank-edge synchronized signal). For this reason, count-up of each of the reference angular counter 55 and the angular counter 57 and output of the angle clock from the angular counter 57 are carried out every time of Tp/10, respectively.

Subsequently, when the crank signal falls, the crank position of the crankshaft CS is equivalent to the end position of one of the first pulse missing portions K1 corresponding to the reference position of #1BTDC. The operations of the microcomputer 13 in steps S315 and S320 therefore allow the count values of the reference angular counter 55, angular counter 57, and the crank position counter 13b to be initialized to 1. In addition, the operation of the microcomputer 13 in step S335 sets the angle-clock multiplication stored in the multiplication storing module 52 to 10. Moreover, the operation of the microcomputer 13 in step S350 initializes the count value of the guard event counter 56 to 1.

For a time interval between the timing corresponding to the #1BTDC and the trailing edge of a next crank pulse in the crank signal, in other words, the time interval for which the count value of the crank position counter 13b shifts to 2 from 1, the value (Ta in FIG. 8) obtained by dividing a pulse edge interval (T in FIG. 8) corresponding to one of the first pulse missing portions K1 and measured by the measuring module 51 by 30 has been stored in the one angle clock time storing module 53 as the one angle-clock time corresponding to the crank angle of 1 degree. For this reason, count-up of each of the reference angular counter 55 and the angular counter 57 and output of the angle clock from the angular counter 57 are carried out every time of Tp/30 during the time interval between the end position of one of the second pulse missing portions K2 and the trailing edge of a next crank pulse, respectively.

Next, after the count value of the crank position counter 13b reaches 2 in synchronization with the trailing edge of the next crank pulse in the crank signal based on the operation of the microcomputer 13 in step S325, count-up of each of the reference angular counter 55 and the angular counter 57 and output of the angle clock from the angular counter 57 are repeatedly carried out every time of Tp/10, respectively. In addition, after the count value of the crank position counter 13b reaches 2 in synchronization with the trailing edge of the next crank pulse in the crank signal based on the operation of the microcomputer 13 in step S325, the count value of the guard event counter 56 is incremented by 1 every time the crank signal falls (the crank-edge synchronized signal rises).

This allows the count values of the reference angular counter 55 and the angular counter 57 not to exceed the guard value based on the count value of the guard event counter 56 that the cont values of the counters 55 and 57 should take at the trailing timing of a next crank pulse in the crank signal (the riding edge of a next crank pulse in the crank-edge synchronized signal). Moreover, the count value of the crank position counter 13b is incremented by 1 in synchronization with each trailing edge of the crank signal (each rising edge of the crank-edge synchronized signal) based on the operation of the microcomputer 13 in step S325.

The operations set forth above allow the reference counter 55 and the angular counter 57 to count up by 1 every time interval corresponding to the crank angle of 1 degree and to wrap around within the range of 1 to 720. This allows the count values of the reference counter 55 and the angular counter 57 to represent the crank position of the crankshaft CS with reference to the #1BTDC with the resolution of the crank angle of 1 degree.

Note that, in the operations of the microcomputer 13 in steps S370 and S375, the count value of the crank position counter 13*b* is incremented by 2 corresponding to the two pulse missing. This allows the count value of the crank position counter 13*b* to warp around within the range of 1 to 72. For example, when generating events at constant crank-angle intervals, the crank position counter 13*b* with the wrap around function allows at least part of the software S to be simply designed. For example, the part of the software S causes a computer to generate an event when the count value of the crank position counter is a positive integer multiple of a given value. In FIG. 8, output intervals of the angle clock pulses of the angle clock signal are widely illustrated than they are, which are similar in FIGS. 11, 13, and 16.

Figure 9:
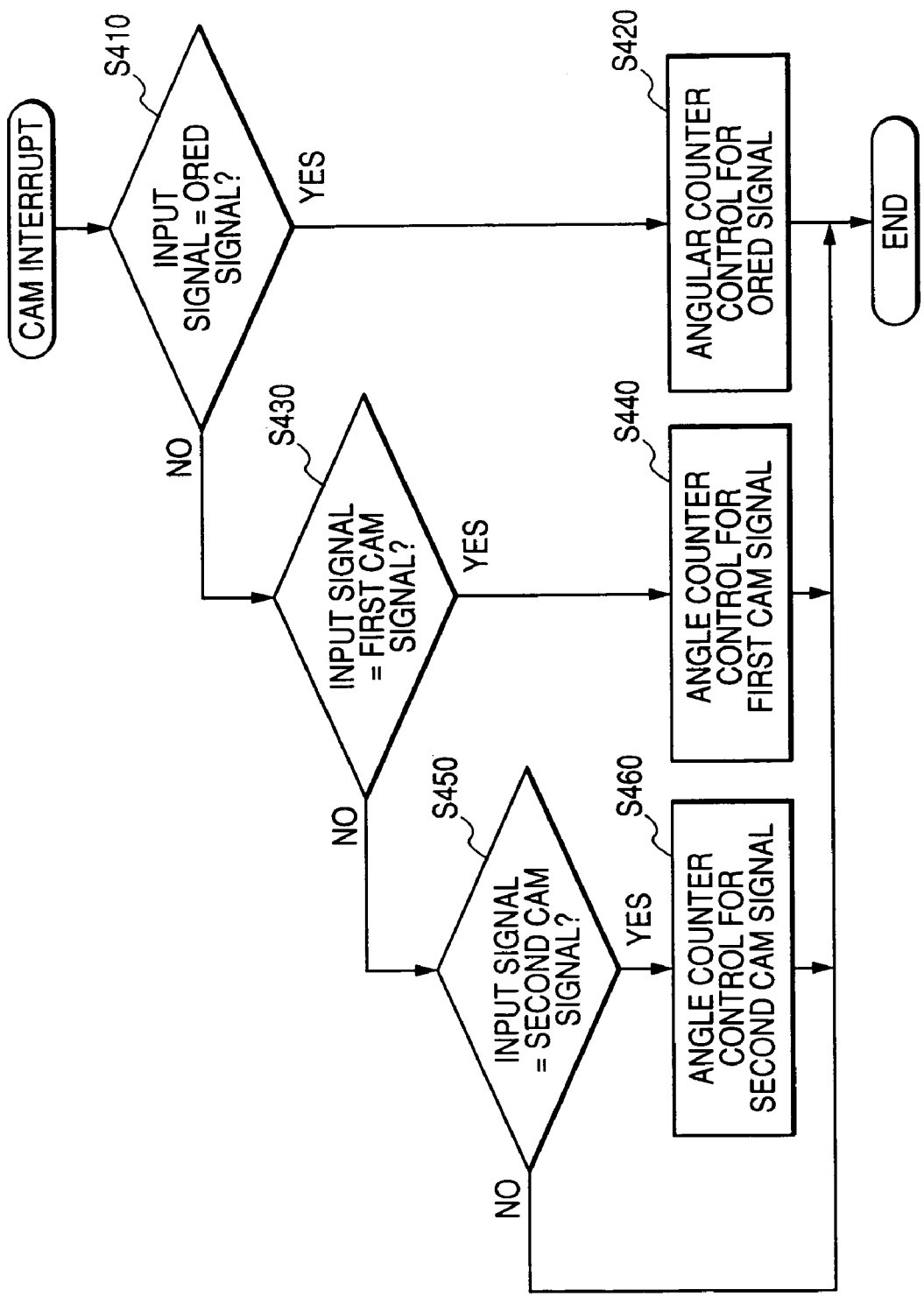
FIG. 9 is a flowchart schematically illustrating a cam interrupt service according to the embodiment of the present invention.

Next, FIG. 9 is a flowchart schematically illustrating a cam interrupt service that is restarted each time a rising edge or a trailing edge appears in any one of the first and second cam signals in accordance with the software S.

When starting to execute the cam inter service, in step S410, the microcomputer 13 refers to the information stored in the memory and representing the diagnosed result for the first and second cam signals. Next, in step S410, the microcomputer 13 determines whether both the first and second cam signals are selected, in other words, the ORed signal of the first and second cam signals is input to the input terminal 20 of the angle clock generating circuit 19.

If it is determined that the first and second cam signals are selected (the determination in step S410 is YES), the microcomputer 13 proceeds to step S420 to execute an angle-counter control task based on the ORed signal of the first and second cam signals, and after completion of the angle-counter control task based on the ORed signal, the microcomputer 13 exits the cam interruption service.

If it is determined that the first and second cam signals are not selected (the determination in step S410 is NO), the microcomputer 13 shifts to step S430 and determines whether the first cam signal is selected as the input signal to the angle clock generating circuit 19. In other words, in step S430, the microcomputer 13 determines whether the first cam-edge synchronized signal is input to the input terminal 20 of the angle clock generating circuit 19.

If it is determined that the first cam signal is selected (the determination in step S430 is YES), the microcomputer 13 proceeds to step S440 to execute an angle-counter control task based on the first cam-edge synchronized signal. After completion of the angle-counter control task based on the first cam-edge synchronized signal, the microcomputer 13 exits the cam interruption service.

If it is determined that the first cam signal is not selected (the determination in step S430 is NO), the microcomputer 13 shifts to step S450 and determines whether the second cam signal is selected as the input signal to the angle clock generating circuit 19. In other words, in step S450, the microcomputer 13 determines whether the second cam-edge synchronized signal is input to the input terminal 20 of the angle clock generating circuit 19.

If it is determined that the second cam signal is not selected (the determination in step S450 is NO), because no cam signals are selected as the input signal, the microcomputer 13 exits the cam interruption service.

In contrast, if it is determined that the second cam signal is selected (the determination in step S450 is YES), the microcomputer 13 proceeds to step S460 to execute an angle-counter control task based on the second cam-edge synchronized signal. After completion of the angle-counter control task based on the second cam-edge synchronized signal, the microcomputer 13 exits the cam interruption service.

Figure 10:
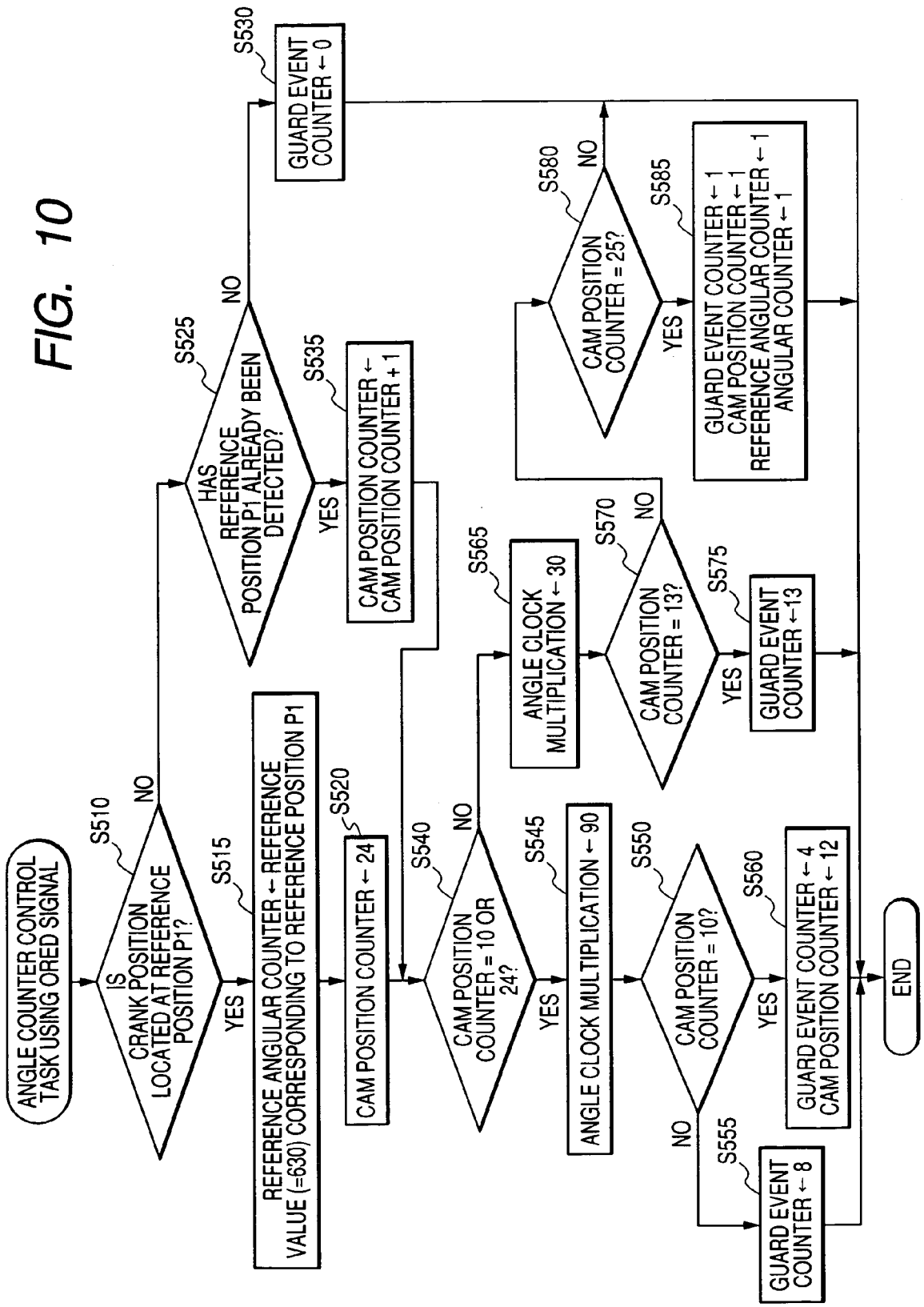
FIG. 10 is a flowchart schematically illustrating an angle-counter control task based on an ORed signal of first and second cam-edge synchronized signals according to the embodiment of the present invention.

Next, FIG. 10 is a flowchart schematically illustrating an angle-counter control task based on the ORed signal of the first and second cam-edge synchronized signals executed in step S420 illustrated in FIG. 9.

When starting to execute the angle-counter control task based on the ORed signal of the first and second cam-edge synchronized signals, in step S510, the microcomputer 13 determines whether the current crank position corresponding to a current riding or trailing edge of the first or second cam signal is located at the reference position P1 of the first cam signal the crank angle of 90 degrees before the #1BTDC.

In step S510, as a first cam signal determining process, the microcomputer 13 measures trailing-edge time intervals between temporally adjacent trailing edges in the first cam signal, and determines whether a ratio of a current measured value T11 to a previous measured value T12 is smaller than a predetermined value of, for example 1/5. When it is determined that the ratio is smaller than the predetermined value, the microcomputer 13 determines that the crank position corresponding to a current trailing edge in the first cam signal is located at the reference position P1 of the first cam signal. Specifically, in step S510, the microcomputer 13 determines whether the current crank position corresponding to a current riding or trailing edge of the first or second cam signal is located at the reference position P1 of the first cam signal based on the result of the first cam signal determining process.

When it is determined that the current crank position corresponds to the reference position P1 of the first cam signal (the determination in step S510 is YES), the microcomputer 13 sets the count value of the reference angular counter 55 to a reference value of 630 corresponding to the reference position P1 of the first cam signal in step S515. Next, in step S520, the microcomputer 13 sets the count value of the cam position counter 13*c* to 24 corresponding to the last value, shifting to step S540. Note that, if the crank signal is normally input to the ECU 1, the count value of the cam position counter 13*c* is fixed to zero.

In contrast, when it is determined that the current crank position does not correspond to the reference position P1 of the first cam signal (the determination in step S510 is NO), the microcomputer 13 proceeds to step S525 and determines whether the reference position P1 of the first cam signal has already being detected. In other words, in step S525, the microcomputer 13 determines whether the affirmative determination in step S510 has occurred one or more times after the affirmative determination in step S410 of FIG. 9.

If it is determined that the reference position P1 of the first cam signal has not being detected yet (the determination in step S525 is NO), the microcomputer 13 proceeds to step S530. In step S530, the microcomputer 13 sets the count value of the guard event counter 56 to zero to allow the reference angular counter 55 and the angular counter 57 not to count up, exiting the angular counter control process based on the ORed signal.

In contrast, if it is determined that the reference position P1 of the first cam signal has already being detected (the determination in step S525 is YES), the microcomputer 13 shifts to step S535 and increments the cam position counter 13*c* by 1, proceeding to step S540.

In step S540, the microcomputer 13 determines whether the count value of the cam position counter 13c is 10 or 24. If it is determined that the count value of the cam position counter 13c is 10 or 24 (the determination in step S540 is YES), the microcomputer 13 proceeds to step S545 and sets the angle-clock multiplication stored in the multiplication storing module 52 to 90.

Next, in step S550, the microcomputer 13 determines whether the count value of the cam position counter 13c is 10, and if it is determined that the count value of the cam position counter 13c is not 10 but 24 (the determination in step S550 is NO), the microcomputer 13 proceeds to step S555. In step S555, the microcomputer 13 sets the count value of the guard event counter 56 to 8, exiting the angular counter control process based on the ORed signal.

When it is determined that the count value of the cam position counter 13c is 10 (the determination in step S550 is YES), the microcomputer 13 shifts to step S560. In step S560, the microcomputer 13 sets the count value of the guard event counter 56 and that of the cam position counter 13c to 4 and 12, respectively, exiting the angular counter control process based on the ORed signal.

On the other hand, if it is determined that the count value of the cam position counter 13c is not any one of 10 and 24 (the determination in step S550 is NO), the microcomputer 13 shifts to step S565 and sets the angle-clock multiplication stored in the multiplication storing module 52 to 30.

Thereafter, the microcomputer 13 proceeds to step S570 and determines whether the count value of the cam position counter 13c is 13. If it is determined that the count value of the cam position counter 13c is 13 (the determination in step S570 is YES), the microcomputer 13 proceeds to step S575 and sets the count value of the guard event counter 56 to 13, exiting the angular counter control process based on the ORed signal.

In contrast, if it is determined that the count value of the cam position counter 13c is not 13 (the determination in step S575 is NO), the microcomputer 13 shifts to step S580 and determines whether the count value of the cam position counter 13c is 25 in step S580.

If it is determined that the count value of the cam position counter 13c is not 25 (the determination in step S580 is NO), the microcomputer 13 exits the angular counter control process based on the ORed signal; otherwise (the determination in step S580 is YES), proceeds to step S585. In step S585, the microcomputer 13 sets the count values of guard event counter 56, the reference angular counter 55, the angular counter 57, and the cam position counter 13c to 1, respectively, exiting the angular counter control process based on the ORed signal.

Specifically, when the crank signal is abnormally input to the ECU 11, but the first and second cam signals are normally input thereto, the time-synchronized task illustrated in FIG. 6 allows the ORed signal of the first and second cam-edge synchronized signals to be input to the angle clock generating circuit 19 from the input control circuit 17. The ORed signal of the first and second cam-edge synchronized signals will be referred to simply as ORed signal hereinafter. As a result, the angular counter control task based on the ORed signal illustrated in FIG. 10 in place of the task illustrated in FIG. 7 allows the count value of the angular counter 57 to vary illustrated in FIG. 11.

Figure 11:
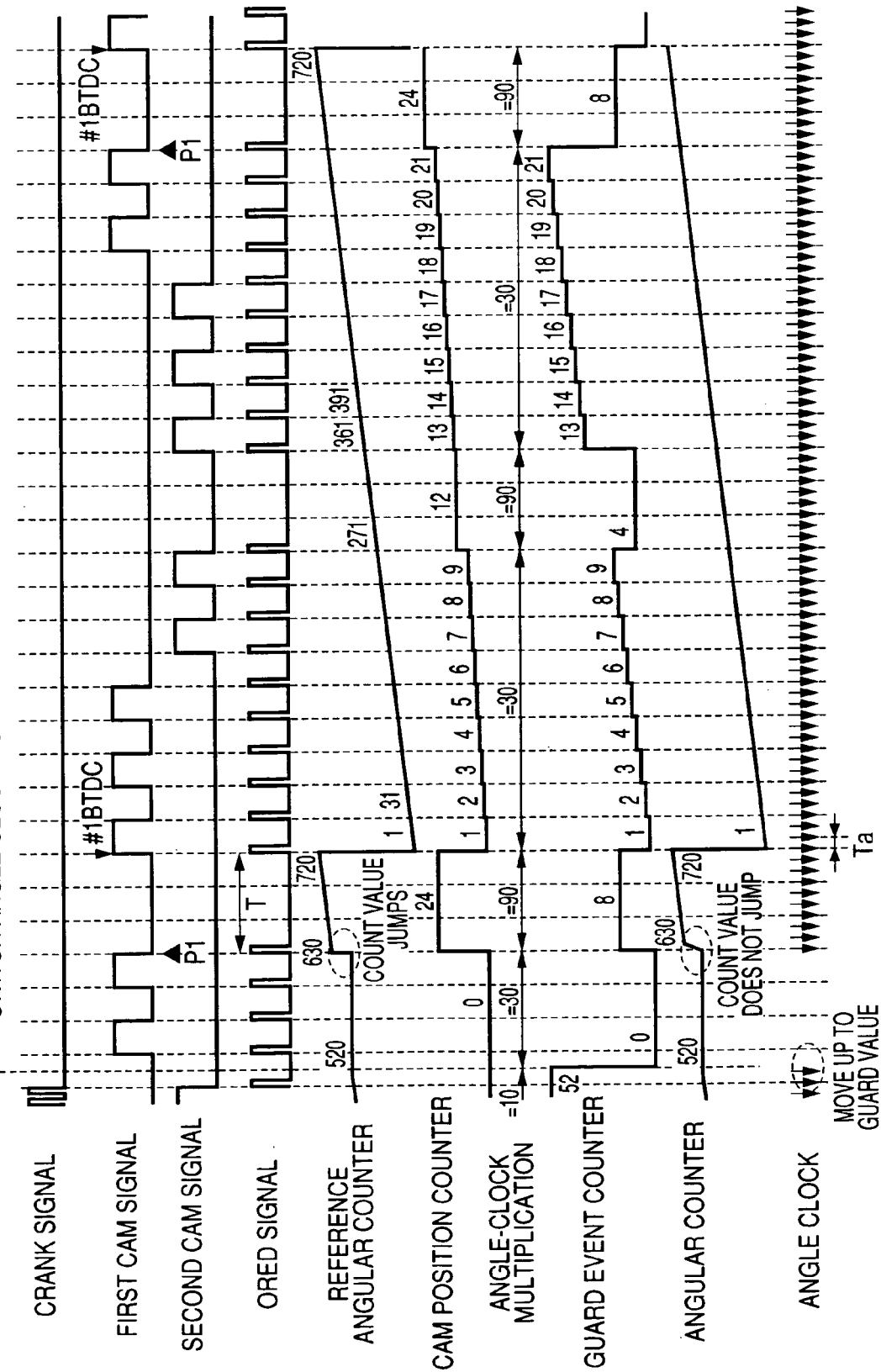
FIG. 11 is a time chart schematically illustrating the crank signal, the first and second cam signals, and the output signals, and changes of count values of the counters according to the embodiment of the present invention.

As illustrated in FIG. 11, when the change of the crank signal in level is stopped, the operation of the microcomputer 13 in step S295 of FIG. 6 sets the count value of the guard counter 56 to zero, thereby preventing the reference angular counter 55 and the angular counter 57 from counting up. In addition, the operation of the microcomputer 13 in step S295 sets the angle-clock multiplication stored in the multiplication storing module 52 to 30. The count value of the guard event counter 56 is kept to zero based on the operation of the microcomputer 13 in step S530 of FIG. 10 until the crank position of the crankshaft CS reaches the reference position P1 of the first cam signal.

Thereafter, when the crank position reaches the reference position P1 of the first cam signal, the operations of the microcomputer 13 in steps S515 and S520 of FIG. 10 set the count value of the reference angular counter 55 to 630 corresponding to the reference position P1, and that of the cam position counter 13c to 24. In addition, the operation of the microcomputer 13 in step S545 sets the angle-clock multiplication stored in the multiplication storing module 52 to 90, and that of the microcomputer 13 in step S555 sets the count value of the guard event counter 56 to 8. This permits the guard value for each of the reference angular counter 55 and the angular counter 57 to be set to 720 obtained by the product of 8 and 90. Set of the count value of the reference angular counter 55 to 630 allows the angular counter 57 to promptly count up by 1 from a fixed value of, for example, 520 up to 630 in synchronization with the system clock. This can prevent dropouts of the operations, such as injecting operation, igniting operation, and the like, being synchronized with change of the count value of the angular counter 57.

Thereafter, until the crank position reaches the #1BTDC, a value has been stored in the one angle clock time storing module 53 as the one angle-clock time corresponding to the crank angle of 1 degree. The stored value is obtained by dividing, by 30, the crank angle of 30 degrees corresponding to a pulse edge interval between the riding edge of a pulse in the ORed signal immediately before a next pulse and the riding edge of the next pulse corresponding to the reference position P1. For this reason, count-up of each of the reference angular counter 55 and the angular counter 57 and output of the angle clock from the angular counter 57 are carried out every time of the crank angle of 1 degree until the crank position reaches the #1BTDC.

Subsequently, when the ORed signal rises, the crank position of the crankshaft CS corresponds to the #1BTDC. The operation of the microcomputer 13 in step S535 allows the count value of the cam position counter 13c to be temporally changed from 24 to 25. Because the count value 25 of the cam position sensor 13c allows the determination in step S580 to be affirmative, the operation of the microcomputer 13c in step S585 initializes the count value of the cam position sensor 13c to 1. Similarly, the operation of the microcomputer 13c in step S585 initializes the count values of the reference angular counter 55, the angular counter 57, and the guard event counter 56 to 1, respectively. In addition, the operation of the microcomputer 13c in step S585 allows the angle-clock multiplication stored in the multiplication storing module 52 to be returned to 30.

For a time interval between the timing corresponding to the #1BTDC and the riding edge of a next pulse in the ORed signal, a value (Ta in FIG. 11) has been stored in the one angle clock time storing module 53 as the one angle-clock time corresponding to the crank angle of 1 degree. The time interval represents a time interval for which the count value of the cam position counter 13c shifts to 2 from 1, and the stored value is obtained by dividing a pulse edge interval (T in FIG. 11) between the reference position P1 of the first cam signal and the #1BTDC by 90.

For this reason, count-up of each of the reference angular counter 55 and the angular counter 57 and output of the angle clock from the angular counter 57 are carried out every time of the crank angle of 1 degree.

After the crank position reaches the #1BTDC, the count value of the cam position counter 13c is incremented by 1 every time any one of a riding edge and a trailing edge appears in the ORed signal based on the operation of the microcomputer 13 in step S535.

Next, the count value of the cam position counter 13c reaches 2 in synchronization with a riding edge or a trailing edge of the ORed signal appeared immediately after the timing at which the crank position reaches the #1BTDC. After the count value of the cam position counter 13c reaches 2, count-up of each of the reference angular counter 55 and the angular counter 57 and output of the angle clock from the angular counter 57 are repeatedly carried out every time of a pulse edge interval. The pulse edge interval is obtained by dividing, by 30, a time interval between temporally adjacent riding edges corresponding to the crank angle of 30 degrees. In addition, the guard event counter 56 counts up by 1 every time the ORed signal rises. This allows the count values of the reference angular counter 55 and the angular counter 57 not to exceed the guard value based on the count value of the guard event counter 56 that the cont values of the counters 55 and 57 should take at the riding timing of a next pulse in the ORed signal.

When the count value of the cam position counter 13c is changed from 9 to 10, the operation of the microcomputer 13 in step S545 sets the angle-clock multiplication stored in the multiplication storing module 52 to 90. In addition, the operation of the microcomputer 13 in step S560 increments the count value of the cam position counter 13c by 2 so that the count value of the cam position counter 13c is corrected to 12. Similarly, the operation of the microcomputer 13 in step S560 corrects the count value of the guard event counter 56 to 4. The corrections are required due to change of the angle-clock multiplication to 90, and required to set the guard value to 360 during the crank angle of 90 degrees from the crank position the crank angle of 270 degree after the #1BTDC.

Note that, even if the angle-clock multiplication is changed to 90 by the operation of the microcomputer 13 in step S545, the one angle-clock time stored in the one angle-clock time storing module 53 is updated in synchronization with only the riding edge of a next pulse in the ORed signal. For this reason, during a time interval corresponding to the crank angle of 90 degrees from the crank position the crank angle of 270 degree after the #1BTDC, count-up of each of the reference angular counter 55 and the angular counter 57 and output of the angle clock from the angular counter 57 are carried out every time of a time interval obtained by dividing, by 30, an interval of temporally adjacent riding edges in the ORed signal immediately before the time interval.

Thereafter, the count value of the cam position counter 13c is incremented by 1 every time any one of a riding edge and a trailing edge appears in the ORed signal based on the operation of the microcomputer 13 in step S535. When the count value of the cam position counter 13c reaches 13, the operation of the microcomputer 13 in step S565 allows the angle-clock multiplication stored in the multiplication storing module 52 to be returned to 30. In addition, the operation of the microcomputer 13 in step S575 sets the count value of the guard event counter 56 to 13 in order to set the guard value to 390 until a next riding edge appears in the ORed signal.

For a time interval between the timing at which the cam position counter 13c reaches 13 and that at which the riding edge of a next pulse appears in the ORed signal, in other words, at which the cam position counter 13c reaches 14, the value obtained by dividing, by 90, a time interval of temporally adjacent riding edges in the ORed signal immediately before the time interval has been stored in the one angle clock time storing module 53 as the one angle-clock time corresponding to the crank angle of 1 degree. For this reason, count-up of each of the reference angular counter 55 and the angular counter 57 and output of the angle clock from the angular counter 57 are carried out every one angle-clock time stored in the one angle clock time storing module 53, respectively.

Next, after the count value of the cam position counter 13c reaches 14 in synchronization with an edge of the next pulse in the ORed signal based on the operation of the microcomputer 13 in step S535, count-up of each of the reference angular counter 55 and the angular counter 57 and output of the angle clock from the angular counter 57 are repeatedly carried out every time of a pulse edge interval. The pulse edge interval represents a time interval between temporally adjacent riding edges and corresponds to the crank angle of 30 degrees. In addition, the guard event counter 56 counts up by 1 every time the ORed signal rises. This allows the count values of the reference angular counter 55 and the angular counter 57 not to exceed the guard value based on the count value of the guard event counter 56 that the cont values of the counters 55 and 57 should take at the riding timing of a next pulse in the ORed signal. In addition, the count value of the cam position counter 13c is incremented by 1 every time the ORed signal rises.

Subsequently, when the crank position of the crankshaft CS reaches the reference position P1 of the first cam signal, the operations of the microcomputer 13 in steps S515 and S520 therefore allow the count values of the reference angular counter 55 and the cam position counter 13c to be set to 630 and 24, respectively. In addition, the operation of the microcomputer 13 in step S545 sets the angle-clock multiplication stored in the multiplication storing module 52 to 90. Moreover, the operation of the microcomputer 13 in step S555 sets the count value of the guard event counter 56 to 8.

Like the case where the crank signal is normally input to the ECU 11, the operations set forth above allow the reference counter 55 and the angular counter 57 to count up by 1 every time interval corresponding to the crank angle of 1 degree and to wrap around within the range of 1 to 720.

Note that, in the task illustrated in FIG. 10, when the reference position P1 of the first cam signal is detected, the crank position is determined so that the count values of the reference angle counter 55 and the cam position counter 13c are set. In the present invention, however, the count values of the reference angle counter 55 and the cam position counter 13c can be set when the reference position P2 of the second cam signal is detected.

Figure 12:
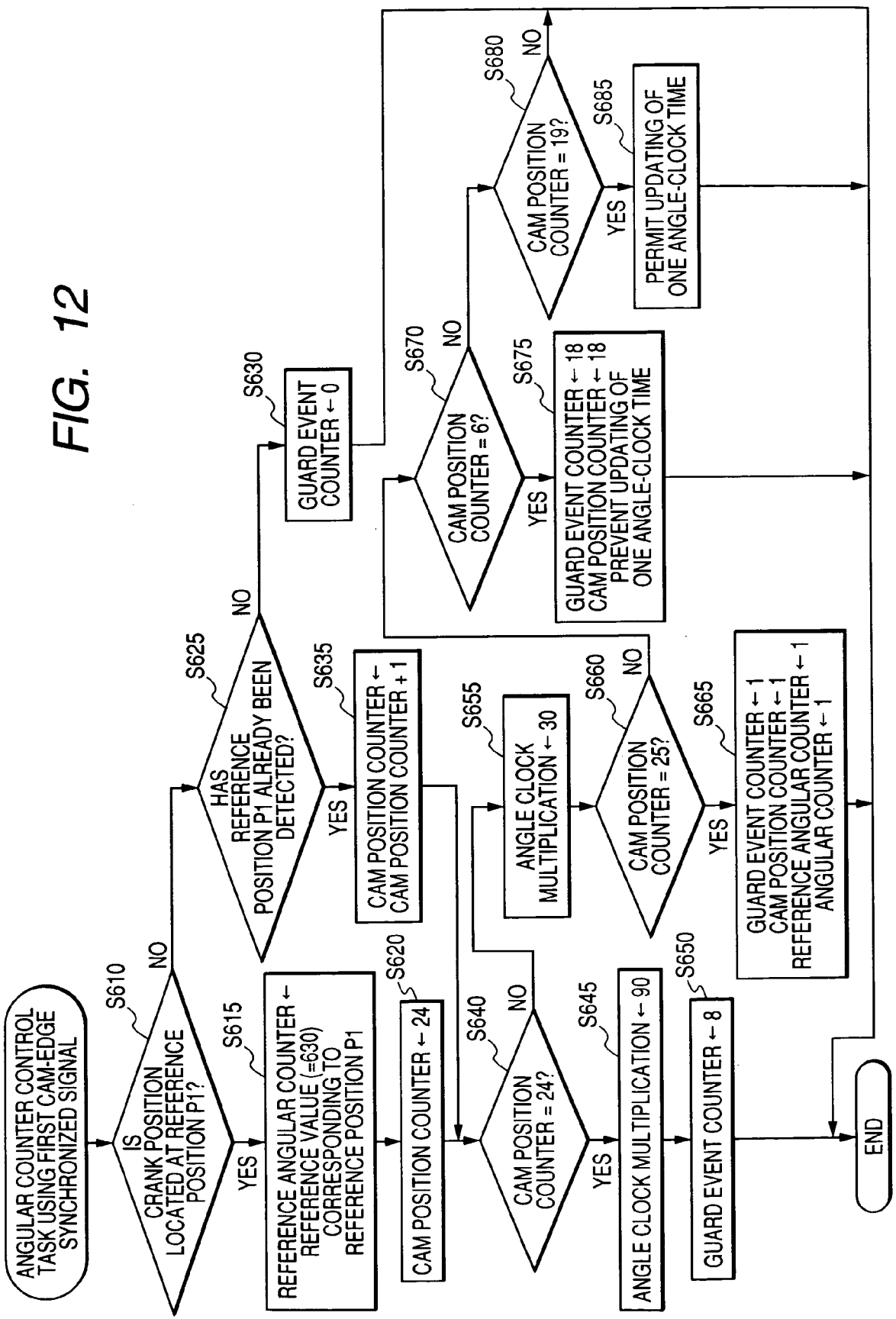
FIG. 12 is a flowchart schematically illustrating an angle-counter control task based on a first cam-edge synchronized signal according to the embodiment of the present invention.

Next, FIG. 12 is a flowchart schematically illustrating an angle-counter control task based on the first cam-edge synchronized signal executed in step S440 illustrated in FIG. 9.

When starting to execute the angle-counter control task based on the first cam-edge synchronized signal, in step S610, the microcomputer 13 determines whether the current crank position corresponding to a current riding or trailing edge of the first cam signal is located at the reference position P1 of the first cam signal the crank angle of 90 degrees before the #1BTDC.

When it is determined that the current crank position corresponds to the reference position P1 of the first cam signal (the determination in step S610 is YES), the microcomputer 13 sets the count value of the reference angular counter 55 to a reference value of 630 corresponding to the reference position P1 of the first cam signal. Next, in step S620, the microcomputer 13 sets the count value of the cam position counter 13c to 24 corresponding to the last value, shifting to step S640.

In contrast, when it is determined that the current crank position does not correspond to the reference position P1 of the first cam signal (the determination in step S610 is NO), the microcomputer 13 proceeds to step S625 and determines whether the reference position P1 of the first cam signal has already being detected. In other words, in step S625, the microcomputer 13 determines whether the affirmative determination in step S610 has occurred one or more times after the affirmative determination in step S430 of FIG. 9.

If it is determined that the reference position P1 of the first cam signal has not being detected yet (the determination in step S625 is NO), the microcomputer 13 proceeds to step S630. In step S630, the microcomputer 13 sets the count value of the guard event counter 56 to zero to allow the reference angular counter 55 and the angular counter 57 not to count up, exiting the angular counter control process based on the first cam-edge synchronized signal.

In contrast, if it is determined that the reference position P1 of the first cam signal has already being detected (the determination in step S625 is YES), the microcomputer 13 shifts to step S635 and increments the cam position counter 13c by 1, proceeding to step S640.

In step S640, the microcomputer 13 determines whether the count value of the cam position counter 13c is 24. If it is determined that the count value of the cam position counter 13c is 24 (the determination in step S640 is YES), the microcomputer 13 proceeds to step S645 and sets the angle-clock multiplication stored in the multiplication storing module 52 to 90. Thereafter, the microcomputer 13 proceeds to step S650 and sets the count value of the guard event counter 56 to 4, exiting the angular counter control process based on the first cam-edge synchronized signal.

On the other hand, if it is determined that the count value of the cam position counter 13c is not 24 (the determination in step S640 is NO), the microcomputer 13 shifts to step S655. In step S655, the microcomputer 13 sets the angle-clock multiplication stored in the multiplication storing module 52 to 30. Next, in step S660, the microcomputer 13 determines whether the count value of the cam position counter 13c is 25.

If it is determined that the count value of the cam position counter 13c is 25 (the determination in step S660 is YES), the microcomputer 13 proceeds to step S665. In step S665, the microcomputer 13 sets the count values of guard event counter 56, the reference angular counter 55, the angular counter 57, and the cam position counter 13c to 1, respectively. Thereafter, the microcomputer 13 exits the angular counter control process based on the first cam-edge synchronized signal.

In contrast, if it is determined that the count value of the cam position counter 13c is not 25 (the determination in step S660 is NO), the microcomputer 13 shifts to step S670 and determines whether the count value of the cam position counter 13c is 6.

If it is determined that the count value of the cam position counter 13c is 6 (the determination in step S670 is YES), the microcomputer 13 proceeds to step S675 and sets each of the count values of the guard event counter 56 and the cam position counter 13c to 18. In addition, in step S675, the microcomputer 13 prevents the one angle-clock time stored in the one angle-clock storing module 53 from being updated, exiting the angular counter control process based on the first cam-edge synchronized signal.

In contrast, if it is determined that the count value of the cam position counter 13c is not 6 (the determination in step S670 is NO), the microcomputer 13 shifts to step S680 and determines whether the count value of the cam position counter 13c is 19.

If it is determined that the count value of the cam position counter 13c is 19 (the determination in step S680 is YES), the microcomputer 13 proceeds to step S685. In step S685, the microcomputer 13 permits updating of one angle clock time stored in the one angle-clock time storing module 53, exiting the angular counter control process based on the first cam-edge synchronized signal.

Specifically, when the crank signal and the second cam signal are abnormally input to the ECU 11, but the first cam signal is normally input thereto, the time-synchronized task illustrated in FIG. 6 allows the first cam-edge synchronized signal to be input to the angle clock generating circuit 19 from the input control circuit 17. As a result, the angular counter control task based on the first cam-edge synchronized signal illustrated in FIG. 12 in place of the task illustrated in FIG. 7 allows the count value of the angular counter 57 to vary illustrated in FIG. 13.

Figure 13:
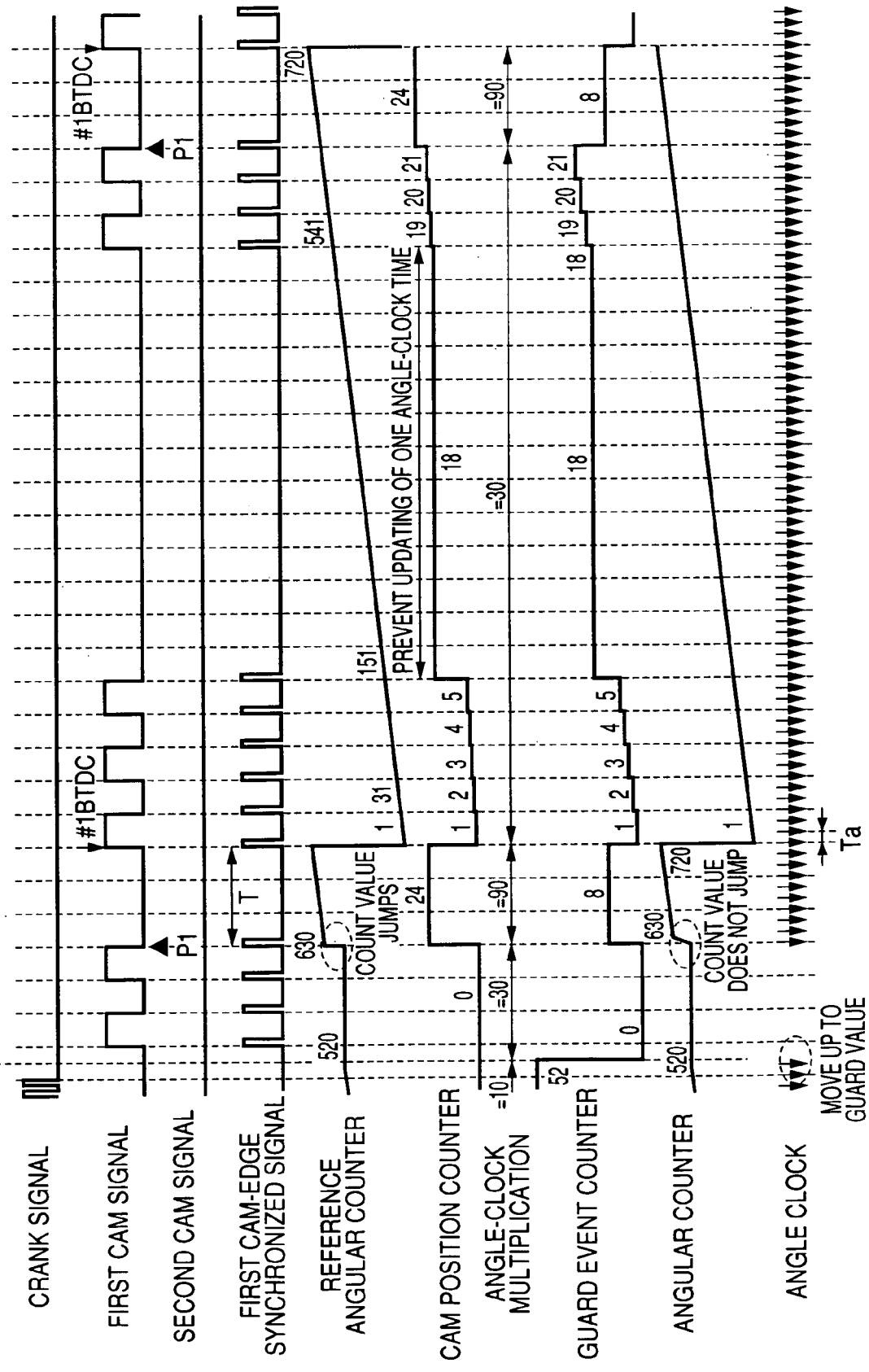
FIG. 13 is a time chart schematically illustrating the crank signal, the first and second cam signals, and the output signals, and changes of count values of the counters according to the embodiment of the present invention.

As illustrated in FIG. 13, when the change of the crank signal in level is stopped, the operation of the microcomputer 13 in step S295 of FIG. 6 sets the count value of the guard counter 56 to zero, thereby preventing the reference angular counter 55 and the angular counter 57 from counting up. In addition, the operation of the microcomputer 13 in step S295 sets the angle-clock multiplication stored in the multiplication storing module 52 to 30. The count value of the guard event counter 56 is kept to zero based on the operation of the microcomputer 13 in step S630 of FIG. 12 until the crank position of the crankshaft CS reaches the reference position P1 of the first cam signal.

Thereafter, when the crank position reaches the reference position P1 of the first cam signal, the operations of the microcomputer 13 in steps S615 and S620 of FIG. 12 set the count value of the reference angular counter 55 to 630 corresponding to the reference position P1, and that of the cam position counter 13c to 24. In addition, the operation of the microcomputer 13 in step S645 sets the angle-clock multiplication stored in the multiplication storing module 52 to 90, and that of the microcomputer 13 in step S650 sets the count value of the guard event counter 56 to 8. This permits the guard value for each of the reference angular counter 55 and the angular counter 57 to be set to 720 obtained by the product of 8 and 90. Like the case of FIG. 11, set of the count value of the reference angular counter 55 to 630 allows the angular counter 57 to promptly count up by 1 from a fixed value of, for example, 520 up to 630 in synchronization with the system clock.

Thereafter, until the crank position reaches the #1BTDC, a value has been stored in the one angle clock time storing module 53 as the one angle-clock time corresponding to the crank angle of 1 degree. The stored value is obtained by dividing, by 30, the crank angle of 30 degrees corresponding to a pulse edge interval between the riding edge of a pulse in the first cam-edge synchronized signal immediately before a next pulse and the riding edge of the next pulse corresponding to the reference position P1. For this reason, count-up of each of the reference angular counter 55 and the angular counter 57 and output of the angle clock from the angular counter 57 are carried out every time of the crank angle of 1 degree until the crank position reaches the #1BTDC.

Subsequently, when the first cam-edge synchronized signal rises, the crank position of the crankshaft CS corresponds to the #1BTDC. The operation of the microcomputer 13 in step S635 allows the count value of the cam position counter 13c to be temporally changed from 24 to 25. Because the count value 25 of the cam position sensor 13c allows the determination in step S660 to be affirmative, the operation of the microcomputer 13c in step S665 initializes the count value of the cam position sensor 13c to 1. Similarly, the operation of the microcomputer 13c in step S665 initializes the count values of the reference angular counter 55, the angular counter 57, and the guard event counter 56 to 1, respectively. In addition, the operation of the microcomputer 13c in step S665 allows the angle-clock multiplication stored in the multiplication storing module 52 to be set to 30 if the count value of the cam position counter 13c is not 24.

For a time interval between the timing corresponding to the #1BTDC and the riding edge of a next pulse in the first cam-edge synchronized signal, a value (Ta in FIG. 13) has been stored in the one angle clock time storing module 53 as the one angle-clock time corresponding to the crank angle of 1 degree. The time interval represents a time interval for which the count value of the cam position counter 13c shifts to 2 from 1, and the stored value is obtained by dividing a pulse edge interval (T in FIG. 13) between the reference position P1 of the first cam signal and the #1BTDC by 90.

For this reason, count-up of each of the reference angular counter 55 and the angular counter 57 and output of the angle clock from the angular counter 57 are carried out every time of the crank angle of 1 degree.

After the crank position reaches the #1BTDC, the count value of the cam position counter 13c is incremented by 1 every time the first cam-edge synchronized signal rises, in other words, any one of a riding edge and a trailing edge appears in the first cam signal based on the operation of the microcomputer 13 in step S635.

Next, the count value of the cam position counter 13c reaches 2 in synchronization with when the first cam-edge synchronized signal rises immediately after the timing at which the crank position reaches the #1BTDC. After the count value of the cam position counter 13c reaches 2, count-up of each of the reference angular counter 55 and the angular counter 57 and output of the angle clock from the angular counter 57 are repeatedly carried out every time of a pulse edge interval. The pulse edge interval is obtained by dividing, by 30, a time interval between temporally adjacent riding edges corresponding to the crank angle of 30 degrees. In addition, the guard event counter 56 counts up by 1 every time the first cam-edge synchronized signal rises. This allows the count values of the reference angular counter 55 and the angular counter 57 not to exceed the guard value based on the count value of the guard event counter 56 that the cont values of the counters 55 and 57 should take at the riding timing of a next pulse in the first cam-edge synchronized signal.

At the crank position when the count value of the cam position counter 13c is changed from 9 to 10, in other words, the crank position the crank angle of 150 degrees after the #1BTDC, the operation of the microcomputer 13 in step S675 allows the count values of the guard event counter 56 and the cam position counter 13c to be set to 18. The operation of the microcomputer 13 in step S675 also prevents the one angle-clock time stored in the one angle-clock storing module 53 from being updated.

Thereafter, the count value of the cam position counter 13c is incremented by 1 at the crank position when the first cam-edge synchronized signal rises next, in other words, the crank position the crank angle of 540 degrees after the #1BTDC based on the operation of the microcomputer 13 in step S635. When the count value of the cam position counter 13c reaches 19, the operation of the microcomputer 13 in step S685 permits updating of the one angle-clock time stored in the one angle-clock time stored in the one angle-clock storing module 53. This allows the one angle-clock time stored in the module 53 to be updated to a time at the timing when the first cam-edge synchronized signal rises next. The updated time is obtained by dividing a time interval between temporally adjacent riding edges immediately before the timing by 30.

During the crank angle of 420 degrees from the crank position 150° CA after the #1BTDC to the timing when the cam position counter 13c reaches 20, the one angle-clock time stored in the one angle-clock time storing module 53 is therefore kept without being updated. Specifically, for the time interval corresponding to the crank angle of 420 degrees, the time obtained by dividing, by 30, a time interval corresponding to the crank angle of 30 degrees for which the count value of the cam position counter 13c has been 5 has been continuously stored in the one angle-clock time storing module 53. For this reason, count-up of each of the reference angular counter 55 and the angular counter 57 and output of the angle clock from the angular counter 57 are carried out every one angle-clock time stored in the one angle clock time storing module 53, respectively.

Next, after the count value of the cam position counter 13c reaches 20, count-up of each of the reference angular counter 55 and the angular counter 57 and output of the angle clock from the angular counter 57 are repeatedly carried out every time of a pulse edge interval. The pulse edge interval represents a time interval between temporally adjacent riding edges immediately before the timing when the count value of the cam position counter 13c reaches 20 and corresponds to the crank angle of 30 degrees. In addition, the guard event counter 56 counts up by 1 every time the first cam-edge synchronized signal rises. This allows the count values of the reference angular counter 55 and the angular counter 57 not to exceed the guard value based on the count value of the guard event counter 56 that the cont values of the counters 55 and 57 should take at the riding timing of a next pulse in the first cam-edge synchronized signal.

Subsequently, when the crank position of the crankshaft CS reaches the reference position P1 of the first cam signal, the operations of the microcomputer 13 in steps S615 and S620 therefore allow the count values of the reference angular counter 55 and the cam position counter 13c to be set to 630 and 24, respectively. In addition, the operation of the microcomputer 13 in step S645 sets the angle-clock multiplication stored in the multiplication storing module 52 to 90. Moreover, the operation of the microcomputer 13 in step S650 sets the count value of the guard event counter 56 to 8.

As set forth above, even if the crank signal and the second cam signal are abnormally input to the ECU 11, like the case where the crank signal is normally input to the ECU 11, it is possible to cause the reference counter 55 and the angular counter 57 to count up by 1 every time interval corresponding to the crank angle of 1 degree and to wrap around within the range of 1 to 720.

Note that, in the task illustrated in FIG. 12, when the count value of the cam position counter 13c is 18, the one angle-clock time stored in the one angle-clock time storing module 53 is prevented from being updated. The reason is as follows:

During a time interval corresponding to the crank angle of 390 degrees when the count value of the cam position counter 13c is 18, it is required to set the guard value for the counters 55 and 57 to 540.

When using a pulse-edge interval measured by the pulse-edge interval measuring module 51 during the crank angle of 390 degrees to generate a pre-correction angle clock corresponding to a time interval during which the count value of the cam position counter 13c is 19, it is necessary to set the angle-clock multiplication stored in the multiplication storing module 52 to 390 during an operation(s), such as the operation of the microcomputer 13 in step S675, required to set the count value of the cam position counter 13c to 18.

As describe above, however, because the guard value is the product of the count value of the guard event counter 56 and the angle-clock multiplication stored in the multiplication storing module 52, set of the angle-clock multiplication stored in the multiplication storing module 52 to 390 makes it difficult to set the guard value to 540 during the crank angle of 390 degrees when the count value of the cam position counter 13c is 18.

In the embodiment, therefore, during the crank angle of 390 degrees when the count value of the cam position counter 13c is 18, the angle-clock multiplication stored in the multiplication storing module 52 is kept to 30, and the count value of the guard event counter 56 is set to 18. This allows the guard value to be set to 540 (corresponding to the product of the 18 and 30) during the crank angle of 390 degrees when the count value of the cam position counter 13c is 18. In addition, in order to limit the one angle-clock time to be used during which the count value of the cam position counter 13c is 19, the one angle-clock time stored in the one angle-clock storing module 53 is prevented from being updated.

Figure 14:
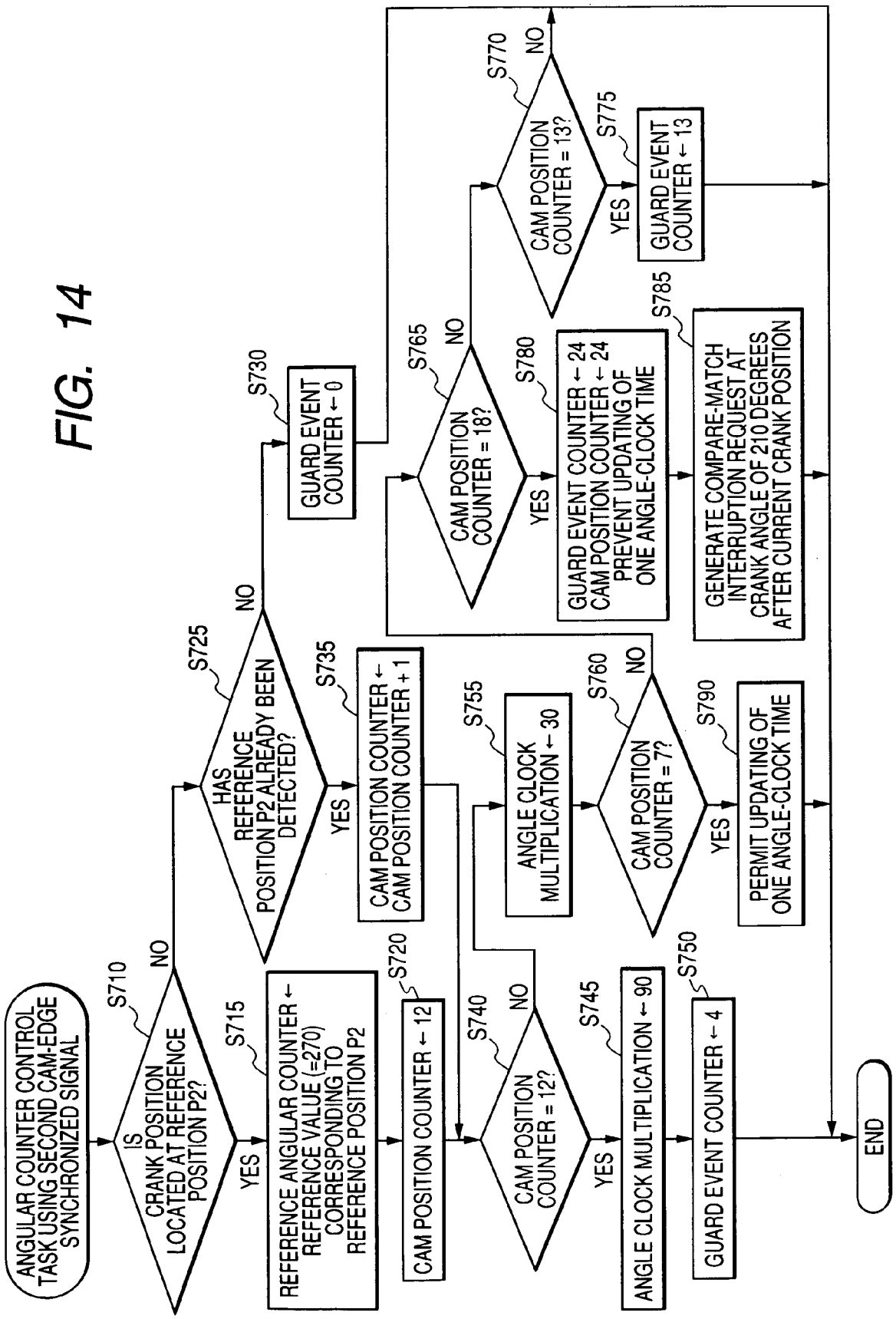
FIG. 14 is a flowchart schematically illustrating an angle-counter control task based on a second cam-edge synchronized signal according to the embodiment of the present invention.

Next, FIG. 14 is a flowchart schematically illustrating an angle-counter control task based on the second cam-edge synchronized signal executed in step S460 illustrated in FIG. 9.

When starting to execute the angle-counter control task based on the second cam-edge synchronized signal, in step S710, the microcomputer 13 determines whether the current crank position corresponding to a current riding or trailing edge of the second cam signal is the reference position P2 of the first cam signal the crank angle of 270 degrees after the #1BTDC.

In step S710, as a second cam signal determining process like the first cam signal determining process, the microcomputer 13 measures trailing-edge time intervals between temporally adjacent trailing edges in the first cam signal. Next, the microcomputer 13 determines whether a ratio of a current measured value T21 to a previous measured value T22 is smaller than a predetermined value of, for example 1/5. When it is determined that the ratio is smaller than the predetermined value, the microcomputer 13 determines that the crank position corresponding to a current trailing edge in the second cam signal is the reference position P2 of the second cam signal. Specifically, in step S710, the microcomputer 13 determines whether the current crank position is the reference position P2 of the second cam signal based on the result of the second cam signal determining process.

When it is determined that the current crank position corresponds to the reference position P2 of the second cam signal (the determination in step S710 is YES), the microcomputer 13 sets the count value of the reference angular counter 55 to a reference value of 270 corresponding to the reference position P2 of the second cam signal in step S715. Next, in step S720, the microcomputer 13 sets the count value of the cam position counter 13c to 12, shifting to step S740.

In contrast, when it is determined that the current crank position does not correspond to the reference position P2 of the second cam signal (the determination in step S710 is NO), the microcomputer 13 proceeds to step S725 and determines whether the reference position P2 of the second cam signal has already being detected. In other words, in step S725, the microcomputer 13 determines whether the affirmative determination in step S710 has occurred one or more times after the affirmative determination in step S450 of FIG. 9.

If it is determined that the reference position P2 of the second cam signal has not being detected yet (the determination in step S725 is NO), the microcomputer 13 proceeds to step S730. In step S730, the microcomputer 13 sets the count value of the guard event counter 56 to zero to allow the reference angular counter 55 and the angular counter 57 not to count up, exiting the angular counter control process based on the second cam-edge synchronized signal.

In contrast, if it is determined that the reference position P2 of the second cam signal has already being detected (the determination in step S725 is YES), the microcomputer 13 shifts to step S735 and increments the cam position counter 13c by 1, proceeding to step S740.

In step S740, the microcomputer 13 determines whether the count value of the cam position counter 13c is 12. If it is determined that the count value of the cam position counter 13c is 12 (the determination in step S740 is YES), the microcomputer 13 proceeds to step S745 and sets the angle-clock multiplication stored in the multiplication storing module 52 to 90. Thereafter, the microcomputer 13 proceeds to step S750 and sets the count value of the guard event counter 56 to 4, exiting the angular counter control process based on the second cam-edge synchronized signal.

On the other hand, if it is determined that the count value of the cam position counter 13c is not 12 (the determination in step S740 is NO), the microcomputer 13 shifts to step S755. In step S755, the microcomputer 13 sets the angle-clock multiplication stored in the multiplication storing module 52 to 30. Next, in step S760, the microcomputer 13 determines whether the count value of the cam position counter 13c is 7.

If it is determined that the count value of the cam position counter 13c is not 7 (the determination in step S760 is NO), the microcomputer 13 proceeds to step S765 and determines whether the count value of the cam position counter 13c is 18.

If it is determined that the count value of the cam position counter 13c is not 18 (the determination in step S765 is NO), the microcomputer 13 shifts to step S770 and determines whether the count value of the cam position counter 13c is 13.

If it is determined that the count value of the cam position counter 13c is not 13 (the determination in step S770 is NO), the microcomputer 13 exits the angular counter control process based on the second cam-edge synchronized signal.

In contrast, if it is determined that the count value of the cam position counter 13c is 13 (the determination in step S770 is YES), the microcomputer 13 sets the count value of the guard event counter 56 to 13, exiting the angular counter control process based on the second cam-edge synchronized signal.

On the other hand, if it is determined that the count value of the cam position counter 13c is 18 (the determination in step S765 is YES), the microcomputer 13 proceeds to step S780 and sets each of the count values of the guard event counter 56 and the cam position counter 13c to 24. In addition, in step S780, the microcomputer 13 prevents the one angle-clock time stored in the one angle-clock storing module 53 from being updated. Subsequently, in step S785, the microcomputer 13 carries out predetermined operations required to generate the compare-match interruption request at the timing the crank angle of 210 degrees after the current crank position.

Specifically, the microcomputer 13 sets 210 to the interrupt occurrence count-value storing module 60; this 210 corresponds to the timing the crank angle of 210 degrees after the current crank position. In addition, the microcomputer 13 permits the compare-match interruption request, and thereafter, exits the angular counter control process based on the second cam-edge synchronized signal.

Moreover, if it is determined that the count value of the cam position counter 13c is 7 (the determination in step S760 is YES), the microcomputer 13 proceeds to step S790. In step S790, the microcomputer 13 permits updating of one angle clock time stored in the one angle-clock time storing module 53, exiting the angular counter control process based on the second cam-edge synchronized signal.

Figure 15:
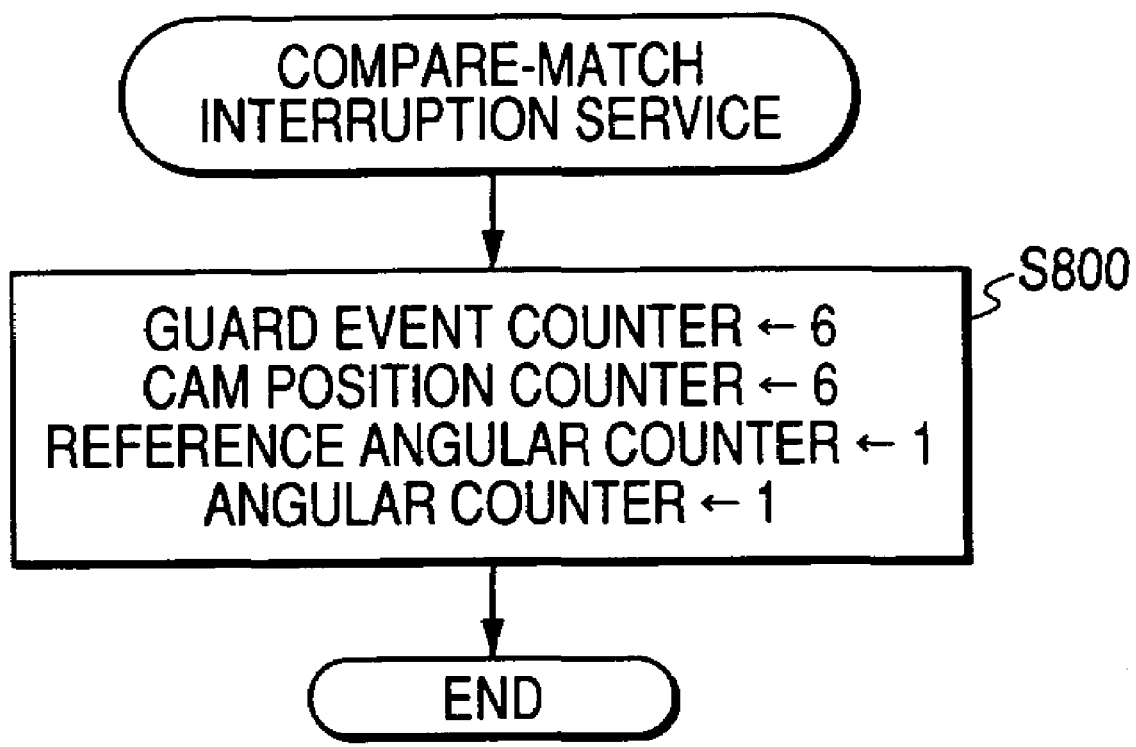
FIG. 15 is a flowchart schematically illustrating a compare-match interruption service according to the embodiment of the present invention.

Next, FIG. 15 is a flowchart schematically illustrating a compare-match interruption service that is launched when the count value of the free-running counter 59 coincides with the value (210) set to the interrupt occurrence count-value storing module 60 so that the compare-match interruption request occurs.

As illustrated in FIG. 15, when starting to execute the compare-match interruption service, the microcomputer 13 sets the count values of the guard event counter 56 and the cam position counter 13c to 6, and sets the count values of the reference angular counter 55 and angular counter 57 to 1. Thereafter, the microcomputer 13 exits the compare-match interruption service and returns to the angular counter control process based on the second cam-edge synchronized signal.

Specifically, when the crank signal and the first cam signal are abnormally input to the ECU 11, but the second cam signal is normally input thereto, the time-synchronized task illustrated in FIG. 6 allows the second cam-edge synchronized signal to be input to the angle clock generating circuit 19 from the input control circuit 17. As a result, the angular counter control task based on the first cam-edge synchronized signal illustrated in FIGS. 14 and 15 in place of the task illustrated in FIG. 7 allows the count value of the angular counter 57 to vary illustrated in FIG. 16.

Figure 16:
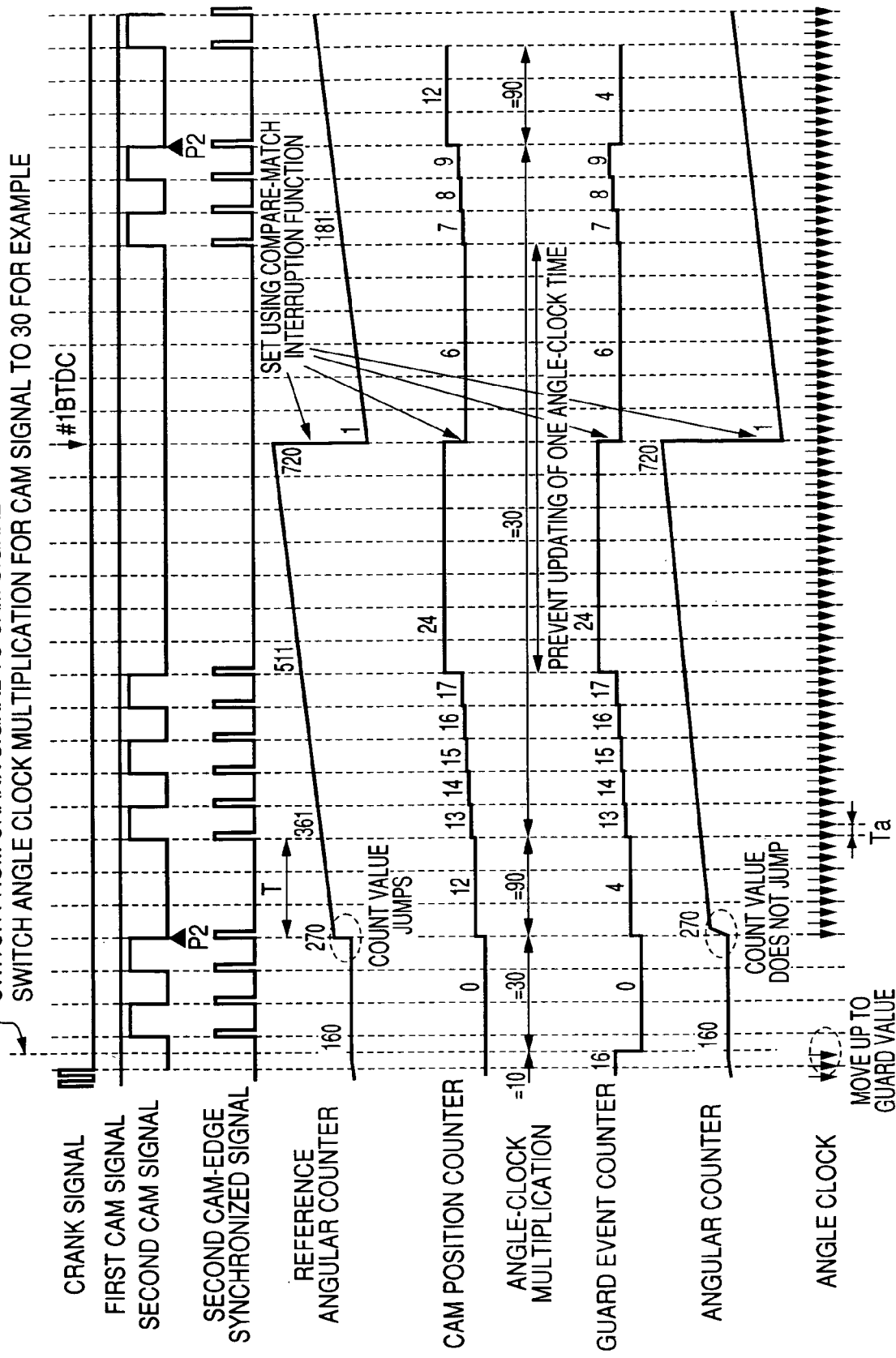
FIG. 16 is a time chart schematically illustrating the crank signal, the first and second cam signals, and the output signals, and changes of count values of the counters according to the embodiment of the present invention.

As illustrated in FIG. 16, when the change of the crank signal in level is stopped, the operation of the microcomputer 13 in step S295 of FIG. 6 sets the count value of the guard counter 56 to zero, thereby preventing the reference angular counter 55 and the angular counter 57 from counting up. In addition, the operation of the microcomputer 13 in step S295 sets the angle-clock multiplication stored in the multiplication storing module 52 to 30. The count value of the guard event counter 56 is kept to zero based on the operation of the microcomputer 13 in step S730 of FIG. 14 until the crank position of the crankshaft CS reaches the reference position P2 of the second cam signal.

Thereafter, when the crank position reaches the reference position P2 of the second cam signal, the operations of the microcomputer 13 in steps S715 and S720 of FIG. 14 set the count value of the reference angular counter 55 to 270 corresponding to the reference position P2, and that of the cam position counter 13c to 12. In addition, the operation of the microcomputer 13 in step S745 sets the angle-clock multiplication stored in the multiplication storing module 52 to 90, and that of the microcomputer 13 in step S750 sets the count value of the guard event counter 56 to 4. This permits the guard value for each of the reference angular counter 55 and the angular counter 57 to be set to 360 obtained by the product of 4 and 90. Like the case of FIG. 11 or FIG. 13, set of the count value of the reference angular counter 55 to 270 allows the angular counter 57 to promptly count up by 1 from a fixed value of, for example, 160 up to 270 in synchronization with the system clock.

Thereafter, until the crank position reaches a position the crank angle of 90 degrees after the reference position P2, a value has been stored in the one angle clock time storing module 53 as the one angle-clock time corresponding to the crank angle of 1 degree. The stored value is obtained by dividing, by 30, the crank angle of 30 degrees corresponding to a pulse edge interval between the riding edge of a pulse in the second cam-edge synchronized signal immediately before a next pulse and the riding edge of the next pulse corresponding to the reference position P2. For this reason, count-up of each of the reference angular counter 55 and the angular counter 57 and output of the angle clock from the angular counter 57 are carried out every time of the crank angle of 1 degree until the crank position reaches the position the crank angle of 90 degrees after the reference position P2.

Subsequently, when the second cam-edge synchronized signal rises, the crank position of the crankshaft CS corresponds to the position the crank angle of 90 degrees after the reference position P2. At the crank position the crank angle of 90 degrees after the reference position P2, the operation of the microcomputer 13 in step S735 allows the count value of the cam position counter 13c to be changed from 12 to 13. In addition, the operation of the microcomputer 13 in step S775 allows the count value of the guard event counter 56 to be set to 13. The operation of the microcomputer 13 in step S755 allows the angle-clock multiplication stored in the multiplication storing module 52 to be returned to 30. In addition, the operation of the microcomputer 13c in step S755 allows the angle-clock multiplication stored in the multiplication storing module 52 to be set to 30 if the count value of the cam position counter 13c is not 12.

For a time interval between the timing corresponding to the timing corresponding to the crank position the crank angle of 90 degrees after the reference position P2 and the riding edge of a next pulse in the second cam-edge synchronized signal, a value (Ta in FIG. 16) has been stored in the one angle clock time storing module 53 as the one angle-clock time corresponding to the crank angle of 1 degree. The time interval represents a time interval for which the count value of the cam position counter 13c shifts to 14 from 13, and the stored value is obtained by dividing a pulse edge interval (T in FIG. 16) corresponding to the crank angle of 90 degrees after the reference position P2 by 90.

For this reason, count-up of each of the reference angular counter 55 and the angular counter 57 and output of the angle clock from the angular counter 57 are carried out every time of the crank angle of 1 degree.

After the count value of the cam position counter 13c reaches 13, the count value of the cam position counter 13c is incremented by 1 every time the second cam-edge synchronized signal rises, in other words, any one of a riding edge and a trailing edge appears in the second cam signal based on the operation of the microcomputer 13 in step S735.

Next, after the count value of the cam position counter 13c reaches 14, count-up of each of the reference angular counter 55 and the angular counter 57 and output of the angle clock from the angular counter 57 are repeatedly carried out every time of a pulse edge interval. The pulse edge interval is obtained by dividing, by 30, a time interval between temporally adjacent riding edges corresponding to the crank angle of 30 degrees. In addition, the guard event counter 56 counts up by 1 every time the second cam-edge synchronized signal rises. This allows the count values of the reference angular counter 55 and the angular counter 57 not to exceed the guard value based on the count value of the guard event counter 56 that the cont values of the counters 55 and 57 should take at the riding timing of a next pulse in the second cam-edge synchronized signal.

At the crank position when the count value of the cam position counter 13c is changed from 17 to 18, in other words, the crank position the crank angle of 240 degrees after the reference position P2 and the crank angle of 210 degrees before the #1BTDC, the operation of the microcomputer 13 in step S780 allows the count values of the guard event counter 56 and the cam position counter 13c to be set to 24. The operation of the microcomputer 13 in step S780 also prevents the one angle-clock time stored in the one angle-clock storing module 53 from being updated.

In addition, the operation of the microcomputer 13 in step S785 carries out the predetermined operations required to generate the compare-match interruption request at the timing the crank angle of 210 degrees after the current crank position; this timing corresponds to the timing of #1BTDC.

After a time obtained by multiplying, by 210, a time corresponding to the crank angle of 30 degrees when the count value of the cam position counter 13c is 17, has elapsed, the compare-match interruption service is launched. The launched compare-match interruption service allows the count values of the guard event counter 56 and the cam position counter 13c to be set to 6. Moreover, the launched compare-match interruption service allows the count values of the reference angular counter 55 and angular counter 57 to be initialized to 1.

Specifically, in the embodiment, no edges appear in the second cam signal at the timing of the #1BTDC at which the count values of the counters 55 and 57 should be initialized. For this reason, the compare-match interruption service is launched at the timing 210° CA before the #1BTDC, and the compare-match operation allows the count values of the counters 13c, 55, 56, and 57 to be initialized. These operations set forth above in the task illustrated in FIG. 14 are mainly different from the operations of the microcomputer 13 illustrated in FIG. 13.

Note that some variation patterns of the first and second cam signals allow an active edge to certainly appear in the input signal input to the angle clock generating circuit 19 at a crank position at which the count values should be initialized. In these cases, it is unnecessary to use the compare-match interrupting function, and the hardware elements required to carry out the compare-match interrupting function can be eliminated.

Thereafter, the count value of the cam position counter 13c is incremented by 1 at the crank position when the second cam-edge synchronized signal rises next, in other words, the crank position the crank angle of 180 degrees after the #1BTDC based on the operation of the microcomputer 13 in step S735. When the count value of the cam position counter 13c reaches 7, the operation of the microcomputer 13 in step S790 permits updating of the one angle-clock time stored in the one angle-clock time stored in the one angle-clock storing module 53. This allows the one angle-clock time stored in the module 53 to be updated to a time at the timing when the second cam-edge synchronized signal rises next, in other words, the count value of the cam position counter 13c reaches 8. The updated time is obtained by dividing a time interval between temporally adjacent riding edges immediately before the timing by 30.

During the crank angle of 420 degrees from the crank position 210° CA after the #1BTDC to the timing when the cam position counter 13c reaches 8, the one angle-clock time stored in the one angle-clock time storing module 53 is therefore kept without being updated. Specifically, for the time interval corresponding to the crank angle of 420 degrees, the time obtained by dividing, by 30, a time interval corresponding to the crank angle of 30 degrees for which the count value of the cam position counter 13c has been 17 has been continuously stored in the one angle-clock time storing module 53. For this reason, count-up of each of the reference angular counter 55 and the angular counter 57 and output of the angle clock from the angular counter 57 are carried out every one angle-clock time stored in the one angle clock time storing module 53, respectively.

Next, after the count value of the cam position counter 13c reaches 8, count-up of each of the reference angular counter 55 and the angular counter 57 and output of the angle clock from the angular counter 57 are repeatedly carried out every time of a pulse edge interval. The pulse edge interval represents a time interval between temporally adjacent riding edges immediately before the timing corresponding to the crank angle of 30 degrees. In addition, the guard event counter 56 counts up by 1 every time the second cam-edge synchronized signal rises. This allows the count values of the reference angular counter 55 and the angular counter 57 not to exceed the count value of the guard event counter 56 that the cont values of the counters 55 and 57 should take at the riding timing of a next pulse in the second cam-edge synchronized signal.

Subsequently, when the crank position of the crankshaft CS reaches the reference position P2 of the second cam signal, the operations of the microcomputer 13 in steps S715 and S720 therefore allow the count values of the reference angular counter 55 and the cam position counter 13c to be set to 270 and 12, respectively. In addition, the operation of the microcomputer 13 in step S745 sets the angle-clock multiplication stored in the multiplication storing module 52 to 90. Moreover, the operation of the microcomputer 13 in step S750 sets the count value of the guard event counter 56 to 4.

As set forth above, even if the crank signal and the first cam signal are abnormally input to the ECU 11, like the case where the crank signal is normally input to the ECU 11, it is possible to cause the reference counter 55 and the angular counter 57 to count up by 1 every time interval corresponding to the crank angle of 1 degree and to wrap around within the range of 1 to 720.

As described above, in the ECU 11 according to the embodiment of the present invention, even if the crank signal is abnormal, if at least any one of the first and second cam signals is normally input to the ECU 11, it is possible to count up the angular counter 57 based on at least any one of the first and second cam signals as in the case with using the crank signal.

Een if the crank signal includes an abnormality, it is possible to therefore control the engine based on the crank-angle synchronized control programs P for referring the count value of the angular counter 57. This allows the vehicle in which the ECU 11 is installed to be driven in a limp-home mode in an event of an error in the crank signal without preparing a fail-safe control program(s) for controlling an engine based on a cam signal as time base.

In addition, in the ECU 11 according to the embodiment, change of the angle-clock multiplication depending on the waveform patterns of the first and second cam signals allows the count value of the angular counter 57 to be changed similarly using the crank signal. It is possible to therefore drive the vehicle in the limp-home mode in an event of an error in the crank signal without using a dedicated circuit required to generate a simulated crank signal based on a cam signal.

The ECU 11 according to the embodiment therefore permits a vehicle to be driven in the limp-home mode in an event of an error in the crank signal while holding the increase in hardware components and/or engine-control software.

In the embodiment, even if a single camshaft is used, when the crank signal is abnormally input to the angle clock generating circuit 19, a cam-edge synchronized signal that rises when a level-inversion appears in a single cam signal and holds the high level during one period of the system clock can be input to the angle clock generating circuit 19. Execution of an angle-counter control task similar to the task illustrated in FIG. 12 or FIG. 14 using the cam-edge synchronized signal can count up the angular counter 57 as in the case where the crank signal is normal.

In the embodiment, the first and second cam-edge synchronized signals are generated. Each of the first and second cam-edge synchronized signals rises when a level-inversion appears in each of the first and second cam signals and holds the high level during one period of the system clock. When the crank signal is abnormal, any one of the fist and second cam-edge synchronized signals, and the ORed signal of them is input to the angle clock generating circuit 19. Any one of the first second cam signal, the second cam signal, ant the ORed signals of first and second cam signals can be input to the angle clock generating circuit 19 without generating the first and second cam-edge synchronized signals when the crank signal is abnormal. This can count up the angular counter 57 as in the case where the crank signal is normal.

The configuration of the embodiment such that the crank-edge synchronized signal and the first and second cam-edge synchronized signals are input to the angle clock generating circuit 19 has an advantage as follows. Specifically, it is possible to short temporally adjacent same-directed active edges in the input signal (one of the edge synchronized signals). This can prevent the clock cycle of a pre-correction angle clock from being different from the crank angle of 1 degree.

In the embodiment, the counters are designed to be incremented, but may be designed to be decremented.

The components (modules) of the input circuit 17 and/or the input control circuit 19 can be implemented as hardware electronic devices or software modules installed in the microcomputer or another microcomputer.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for controlling an engine using a cam signal in addition to a crank signal, the cam signal including a series of changes between high and low levels in a predetermined waveform pattern, same directed edges of the changes of the cam signal corresponding to angular positions of rotation of a camshaft of the engine, the crank signal including a train of crank pulses whose same-directed edges correspond to angular positions of rotation of a crankshaft of the engine, the angular positions of rotation of the camshaft being associated with those of rotation of the crankshaft, the apparatus comprising:

an edge interval measuring unit configured to receive an input signal including a series of changes between high and low levels and to measure an edge interval of temporally adjacent same-directed edges of the input signal;

an input unit configured to input the crank signal as the input signal to the edge interval measuring unit, the edge interval measuring unit measuring one of edge intervals of temporally adjacent same-directed edges of the crank signal;

a multiplication clock signal generating unit configured to generate a multiplication clock signal including a train of clock pulses whose clock cycle is an integral number submultiple of the measured edge interval;

a count unit configured to count in synchronization with the multiplication clock signal;

an abnormality determining unit configured to determine whether the crank signal is abnormal;

a switching unit configured to switch the input signal to the edge interval measuring unit from the crank signal to the cam signal when it is determined that the crank signal is abnormal, the edge interval measuring unit measuring an edge interval of temporally adjacent same-directed edges of the cam signal; and a count-value control unit configured to:

identify the angular positions of the crankshaft based on the cam signal to initialize a count value of the count unit based on the identified angular positions of the crankshaft; and change the integral number based on the predetermined waveform pattern of the cam signal to shift the count value of the count unit as in the case of the crank signal inputting to the edge interval measuring unit.

2. An apparatus according to claim 1, wherein the switching unit is configured to generate an edge-synchronized signal rising when a level change appears in the cam signal and to switch the input signal to the edge interval measuring unit from the crank signal to the edge-synchronized signal as the cam signal.

3. An apparatus according to claim 1, wherein the cam shaft consists of first and second cam shafts so that the cam signal consists of first and second cam signals, and the switching unit is configured to OR the first and second cam signals and to switch the input signal to the edge interval measuring unit from the crank signal to the ORed signal of the first and second cam signals as the cam signal.

4. An apparatus according to claim 3, wherein the switching unit is configured to:

generate a first edge-synchronized signal rising when a level change appears in the first cam signal;

generate a second edge-synchronized signal rising when a level change appears in the second cam signal;

OR the first and second edge-synchronized signals; and
switch the input signal to the edge interval measuring unit from the crank signal to the ORed signal of the first and second edge-synchronize signals as the cam signal in place of the ORed signal of the first and second cam signals.

5. An apparatus according to claim 3, wherein the switching unit is configured to switch the input signal to the edge interval measuring unit from the crank signal to any one of the first cam signal, the second cam signal, and the ORed signal of the first and second cam signals as the cam signal, the abnormality determining unit is configured to determine whether each of the crank signal, the first cam signal, and the second cam signal is abnormal, the switching unit switching:
the input signal to the edge interval measuring unit from the crank signal to the ORed signal of the first and second cam signals as the cam signal when it is determined that the first and second cam signals are normal but the crank signal is abnormal,
the input signal to the edge interval measuring unit from the crank signal to the first cam signal as the cam signal when it is determined that the crank signal and the second cam signal are abnormal but the first cam signal is normal, and
the input signal to the edge interval measuring unit from the crank signal to the second cam signal as the cam signal when it is determined that the crank signal and the first cam signal are abnormal but the second cam signal is normal, and wherein the count value control unit is configured to:
identify the angular positions of the crankshaft based on at least one of the first and second cam signals, initialize the count value of the count unit based on the identified angular positions of the crankshaft, and change the integral number based on the predetermined waveform pattern of the ORed signal of the first and second cam signals to shift the count value of the counter as in the case of the crank signal inputting to the edge interval measuring unit when the ORed signal is input to the edge interval measuring unit,
identify the angular positions of the crankshaft based on the first cam signal, initialize the count value of the count unit based on the identified angular positions of the crankshaft, and change the integral number based on the predetermined waveform pattern of the first cam signal to shift the count value of the counter as in the case of the crank signal inputting to the edge interval measuring unit when the first cam signal is input to the edge interval measuring unit, and
identify the angular positions of the crankshaft based on the second cam signal, initialize the count value of the count unit based on the identified angular positions of the crankshaft, and change the integral number based on the predetermined waveform pattern of the second cam signal to shift the count value of the counter as in the case of the crank signal inputting to the edge interval measuring unit when the second cam signal is input to the edge interval measuring unit.

6. An apparatus according to claim 5, wherein the switching unit is configured to:
generate a first edge-synchronized signal rising when a level change appears in the first cam signal;
generate a second edge-synchronized signal rising when a level change appears in the second cam signal;
OR the first and second edge-synchronized signals; and
switch the input signal to the edge interval measuring unit from the crank signal to any one of the first edge-synchronized signal as the first cam signal, the second edge-synchronized signal as the second cam signal, and the ORed signal of the first and second edge-synchronize signals as the ORed signal of the first and second cam signals as the cam signal.

7. An apparatus according to claim 1, wherein the crank signal includes a pulse-missing portion corresponding to pulse interval in which a predetermined number of crank pulses are skipped, the pulse-missing portion indicating a predetermined angular position of the crankshaft, and the cam signal includes a first series of changes from high and low levels in a first predetermined waveform pattern, the first series of changes appearing before the crankshaft is located at the predetermined angular position, and a second series of changes from high and low levels in a second predetermined waveform pattern, the second series of changes appearing after the crankshaft is located at the predetermined angular position, the first waveform pattern being different from the second waveform pattern.

8. An apparatus according to claim 1, wherein the count-value control unit is configured to cause the count unit to wrap around within a predetermined angular range of the crankshaft as in the case of the crank signal inputting to the edge interval measuring unit.

9. An apparatus according to claim 1, wherein the count-value control unit is configured to prevent the counting during each of the edge intervals in the cam signal.

10. A method of controlling an engine using a cam signal in addition to a crank signal, the cam signal including a series of changes between high and low levels in a predetermined waveform pattern, same directed edges of the changes of the cam signal corresponding to angular positions of rotation of a camshaft of the engine, the crank signal including a train of crank pulses whose same-directed edges correspond to angular positions of rotation of a crankshaft of the engine, the angular positions of rotation of the camshaft being associated with those of rotation of the crankshaft, the method comprising:
when receiving an input signal including a series of changes between high and low levels, measuring an edge interval of temporally adjacent same-directed edges of the input signal;
inputting the crank signal as the input signal to the measuring step, the measuring step measuring one of edge intervals of temporally adjacent same-directed edges of the crank signal;
generating a multiplication clock signal including a train of clock pulses whose clock cycle is an integral number submultiple of the measured edge interval;
counting in synchronization with the multiplication clock signal;
determining whether the crank signal is abnormal;
switching the input signal to the edge interval measuring unit from the crank signal to the cam signal when it is determined that the crank signal is abnormal, the measuring step measuring an edge interval of temporally adjacent same-directed edges of the cam signal;
identifying the angular positions of the crankshaft based on the cam signal to initialize a count value of the count unit based on the identified angular positions of the crankshaft; and
changing the integral number based on the predetermined waveform pattern of the cam signal to shift the count value as in the case of the crank signal inputting to the measuring step.

* * * * *